(12) United States Patent
Schröder

(10) Patent No.: US 6,510,281 B2
(45) Date of Patent: Jan. 21, 2003

(54) PROCESS AND AN APPARATUS FOR LOADING A DISPOSABLE CAMERA WITH A PHOTOGRAPHIC ROLL FILM, AND A DISPOSABLE CAMERA LOADED WITH A PHOTOGRAPHIC ROLL FILM

(75) Inventor: Rolf Schröder, Zomeding (DE)

(73) Assignee: Agfa-Gevaert N.V. (BE)

( * ) Notice: Subject to any disclaimer, the term of this patent is extended or adjusted under 35 U.S.C. 154(b) by 0 days.

(21) Appl. No.: 09/851,202

(22) Filed: May 8, 2001

(65) Prior Publication Data

US 2001/0055479 A1 Dec. 27, 2001

(30) Foreign Application Priority Data

May 9, 2000 (DE) .......................... 100 22 495

(51) Int. Cl.$^7$ .......................... G03B 17/02; G03B 1/00; B23P 21/00
(52) U.S. Cl. .............................. 396/6; 396/388; 29/722
(58) Field of Search .......................... 396/388, 6, 429, 396/387; 29/428, 429, 430, 722, 783, 785, 792, 806; 53/430; 166/69, 73.1

(56) References Cited

U.S. PATENT DOCUMENTS 5,689,876 A * 11/1997 Suzuki et al. ................. 29/722

* cited by examiner

Primary Examiner—David M. Gray
Assistant Examiner—Rochell Blackman
(74) Attorney, Agent, or Firm—Connolly Bove Lodge & Hutz LLP

(57) ABSTRACT

In a process and an apparatus for loading a disposable camera with a photographic film, a film unwinding and film insertion device (8) is provided for unwinding a predetermined film length from a film cartridge (203) of a film unit (2; 2' etc.) to form a film supply roll (202) and for inserting the film cartridge and the film supply roll in a film supply chamber (102) or film cartridge chamber (104) of a camera fabrication unit (KU; KU' etc.) which is disposed in a loading station (L) of the loading apparatus for the disposable camera, wherein the film unwinding and film insertion device (8) comprises two components (814, 817) which can be displaced in relation to each other and which comprise devices for unwinding the film from the film cartridge (203) and for forming the film supply roll (202), and also comprise a third component which can be displaced in relation to said components (814, 817) and which can be displaced in relation to the loading station (L), which third component (809) comprises devices for inserting the film, with the film cartridge and the film supply roll, in the camera fabrication unit. A disposable camera is also described which is loaded with a film by this process using this apparatus.

42 Claims, 29 Drawing Sheets

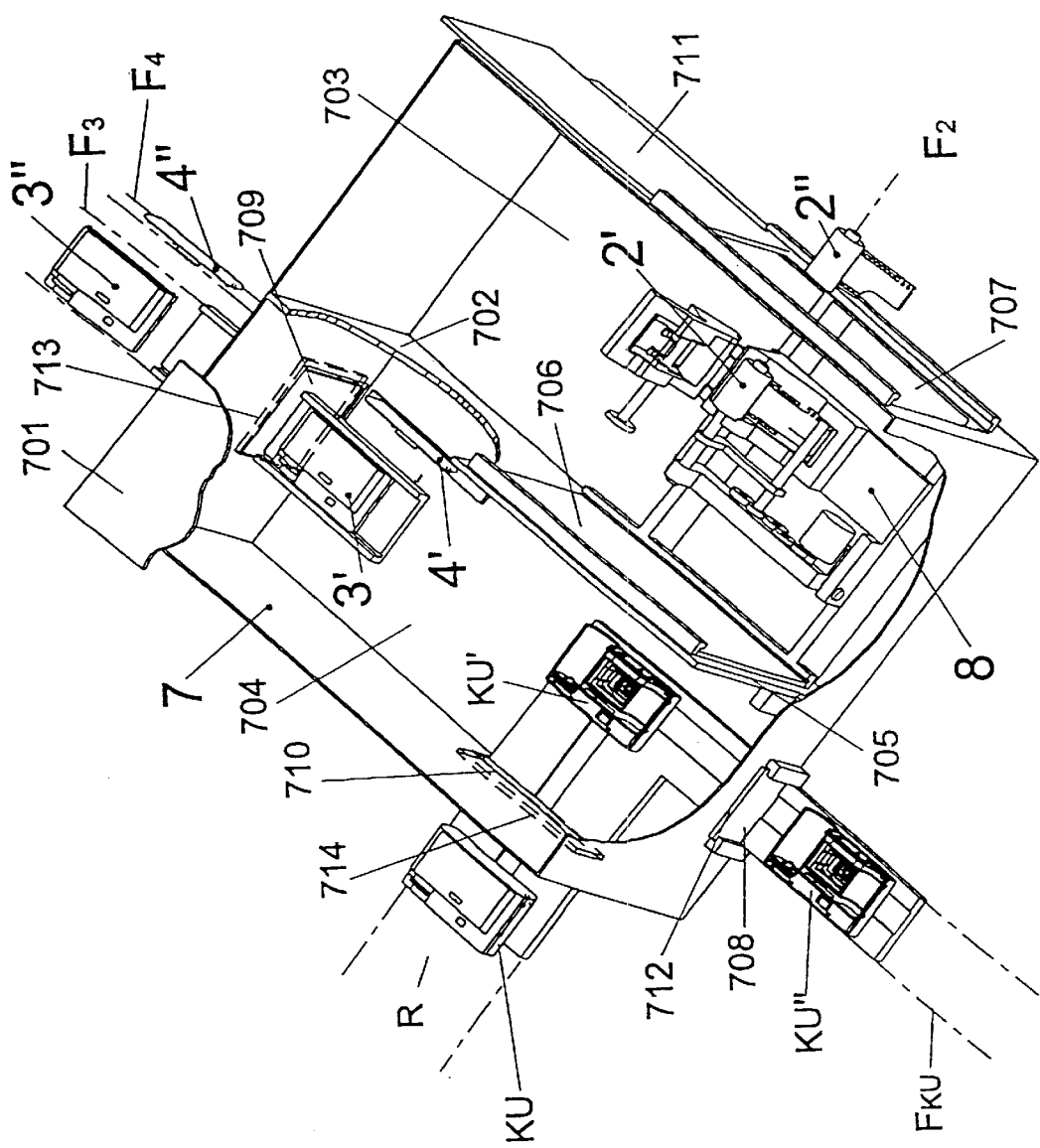

PROCESS AND AN APPARATUS FOR LOADING A DISPOSABLE CAMERA WITH A PHOTOGRAPHIC ROLL FILM, AND A DISPOSABLE CAMERA LOADED WITH A PHOTOGRAPHIC ROLL FILM

This invention relates to a process and an apparatus for loading a disposable camera with a photographic roll film, and to a disposable camera loaded with a photographic roll film.

Disposable cameras which are often referred to as single-use cameras are cameras in which a photographic film is first inserted, not by the end user of the camera, but by the manufacturer of the camera during the assembly thereof. The end user who acquires a disposable camera of this type delivers it, after using it according to the instructions, i.e. after taking a number of photographs, with the film which has been exposed image by image still contained in the camera, to a photographic developing and printing organisation, where the camera is opened in order to remove the exposed film contained therein and to develop and print the latter according to the instructions. After the film has been removed, the opened camera or parts thereof are sent from the developing and printing organisation for reuse or to a recycling process.

Diverse designs of disposable cameras of this type are known.

For example, EP 0 632 314 B1 discloses a disposable camera for a film cartridge and a photographic film of the 135 small image film system. This disposable camera comprises a core subassembly, a housing back part and a housing front part, wherein a central housing base part which protrudes at right angles and two basal flaps are fixed to the housing back part. The core subassembly comprises a film cartridge chamber for receiving a film cartridge, and a film supply chamber for receiving a loose film supply roll.

A disposable camera which is preferably constructed for the use of APS films and which comprises a core subassembly, a housing back part and a housing front part, is known from DE 196 00 270 A1, for example.

It is also known that disposable cameras can be equipped with a built-in flash device, as disclosed in EP 0 551 897 A1 and in U.S. Pat. No. 5,608,486, for example.

Another disposable or so-called single-use camera is known from U.S. Pat. No. 5,689,876.

A process and an apparatus for loading a disposable camera with film are also already known from the aforementioned EP 0 632 314 B1, wherein a film leader section which protrudes from a customary 135 film cartridge is grasped by means of a gripper-like tool and is suspended in a slot of a forked winding spindle. By rotating the latter about its axis, the film is continuously pulled out of the film cartridge as far as a predetermined film length and is wound on to a peripheral surface of the winding spindle, wherein the film cartridge and the winding spindle are disposed on a common, swivel-mounted support. When a predetermined film length has been wound on the winding spindle, the film cartridge and the film roll which is formed on the winding spindle are inserted in a film cartridge chamber or in a film supply chamber of a disposable camera by swivelling the common support, whereupon the film cartridge is separated from the common support, whilst the winding spindle is detached and pulled out of the film supply roll by the axial displacement of the film leader section disposed in the slot of the winding spindle. One edge of the film of the film supply roll is thus seated against a radially inwardly projecting, sickle-like collar on an inner face of the film supply chamber so that it is not pulled out when the winding spindle is pulled off axially. The film cartridge chamber and the film supply chamber of the core subassembly are closed from below in a light-tight manner by folding up basal flaps, which are fixed in the manner of hinges to the housing back part, to the underside of the core subassembly.

A film loading apparatus for the use of film cartridges and films of the APS film system is known from EP 0 965 877 A2, wherein a film is advanced from a film cartridge into a space for forming a film roll by means of an endless, flexible belt which is seated against edges of the film forming a frictional connection and which is driven in circulation by a driving device, wherein the film is entrained by the circulating belt.

The underlying object of the present invention is to provide a process and to create an apparatus for loading a disposable camera with photographic film in which the formation of a film supply roll from a photographic film contained in a film cartridge and the subsequent insertion of the film cartridge and of the film supply roll in a core subassembly of the disposable camera, as well as the subsequent completion of the core subassembly to form a complete disposable camera, is made possible in a particularly simple and reliable manner.

A further underlying object of the invention the object is to create a disposable camera which is of simple construction and which can reliably and efficiently be loaded with photographic film in a mass production operation.

These objects are achieved according to the invention by the features of claims 1, 7 and 32, respectively.

Further forms of the invention are given in the subsidiary claims which follow each of the aforementioned claims.

A preferred embodiment of the invention and modifications thereof are described in detail below with reference to the drawings, where:

Figure 16:
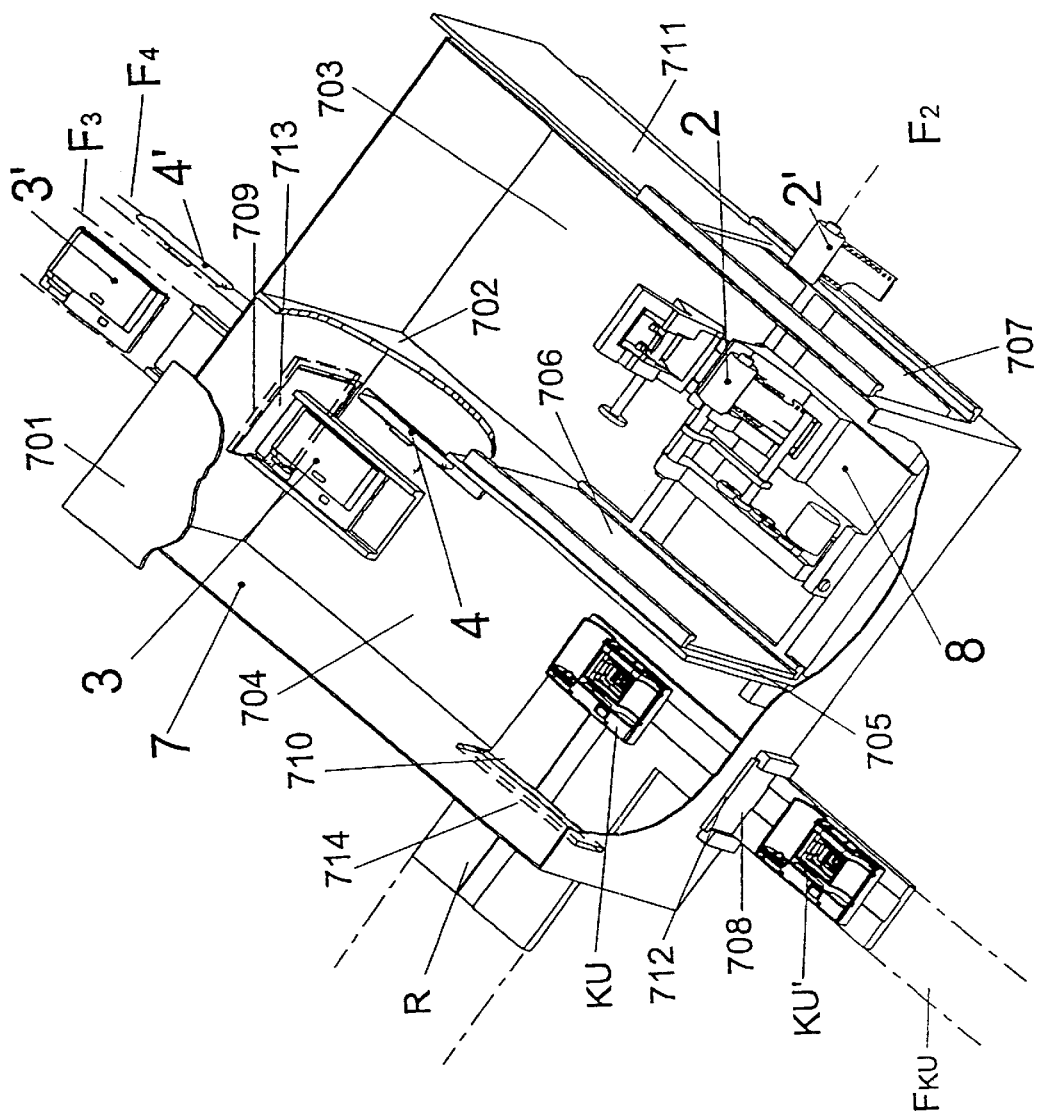
FIG. 16 illustrates the loading apparatus shown in FIG. 13, after feeding a camera fabrication unit into a loading station of the loading apparatus and after feeding a housing back part and a housing base part of a camera each into a stand-by position inside the loading apparatus.
Figure 24:
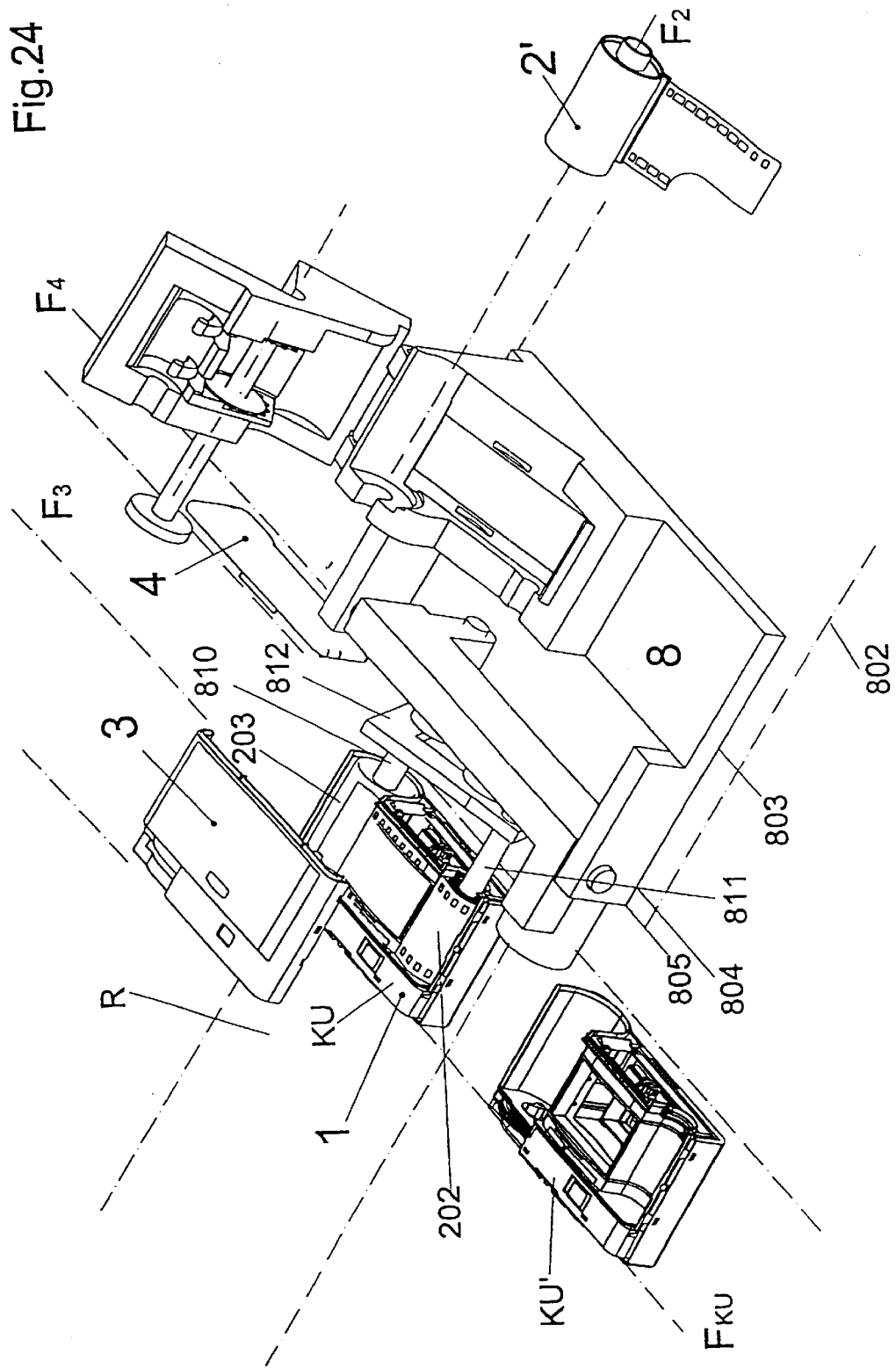
FIG. 24 illustrates the subject of FIG. 23, after positioning a housing back part above the camera fabrication unit.
Figure 25:
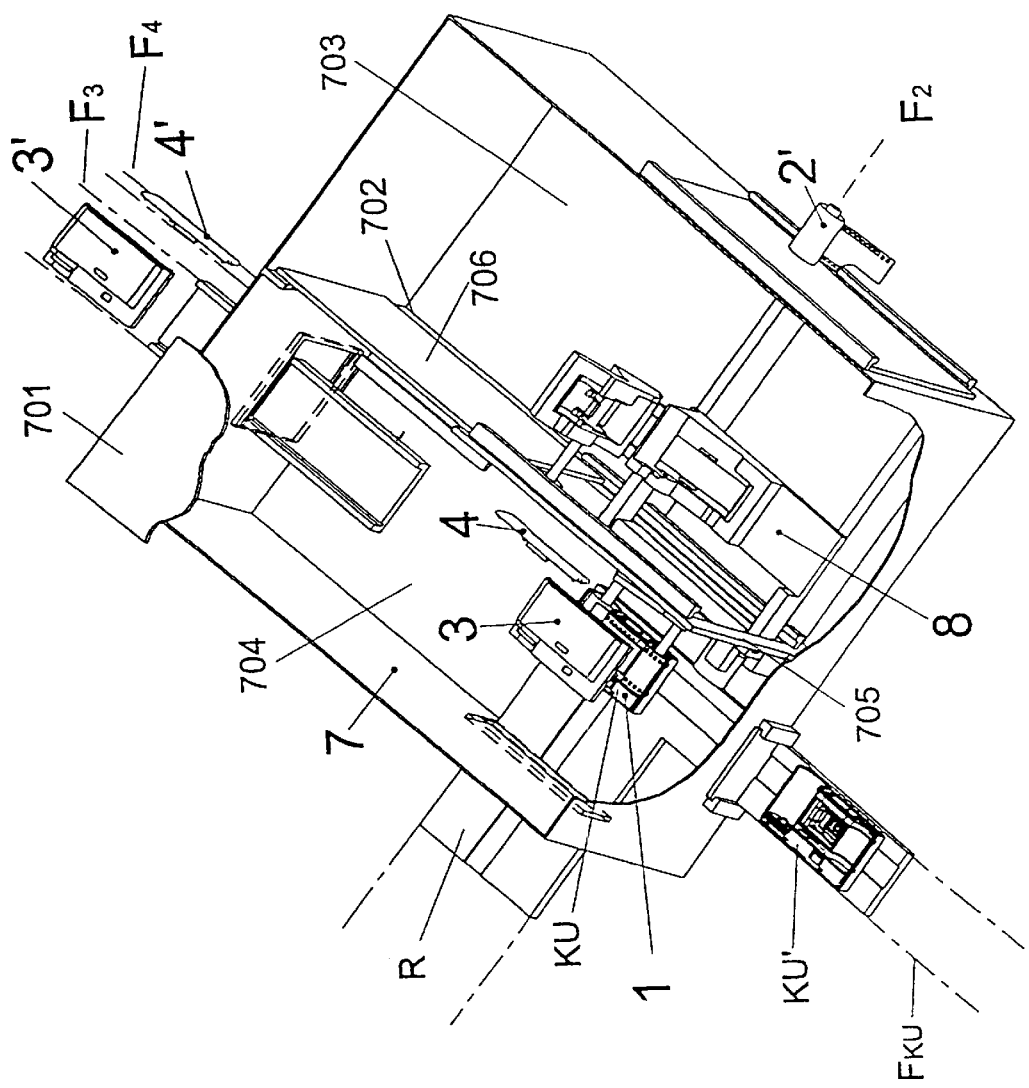
Figure 26:
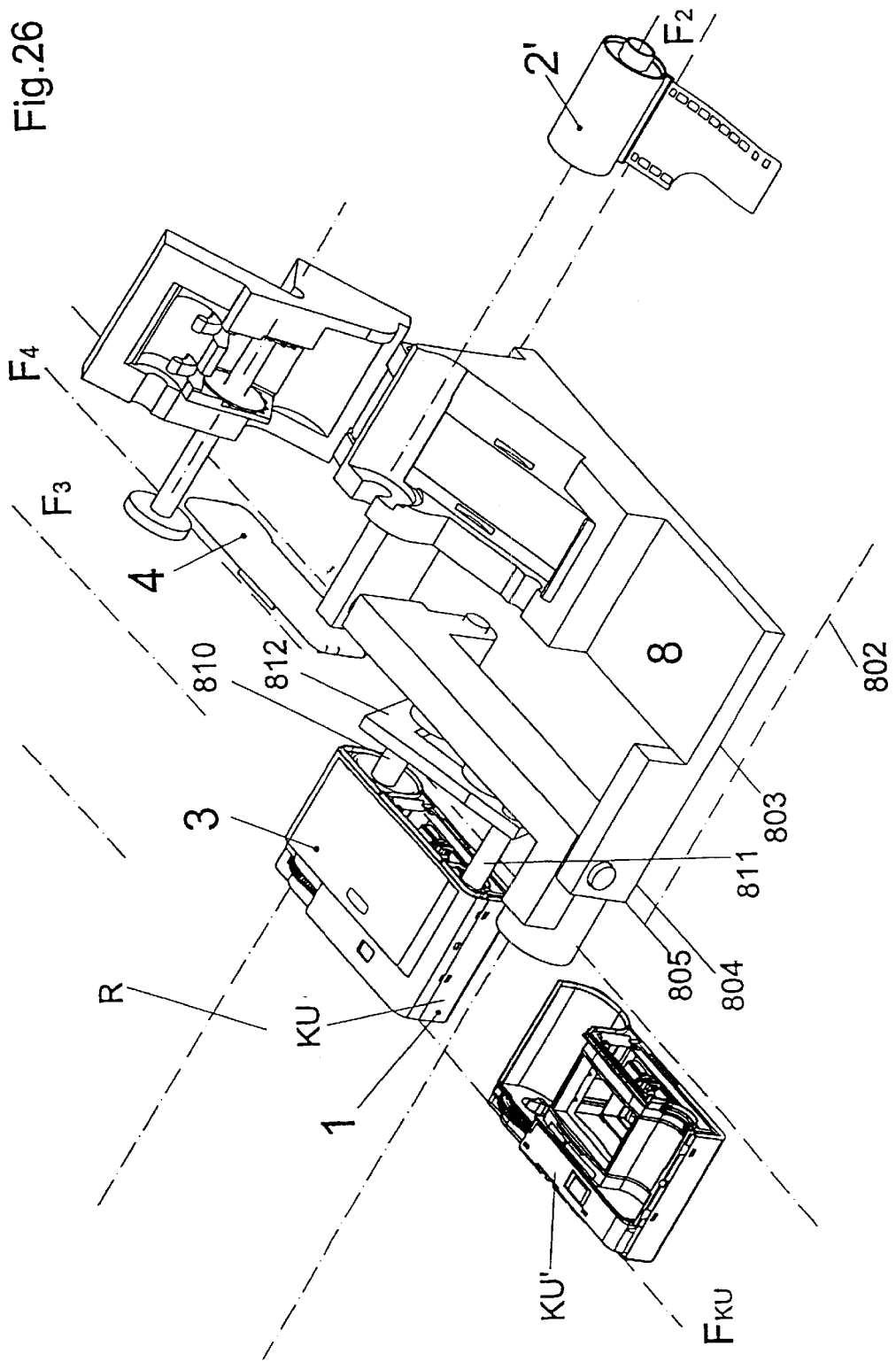
Figure 27:
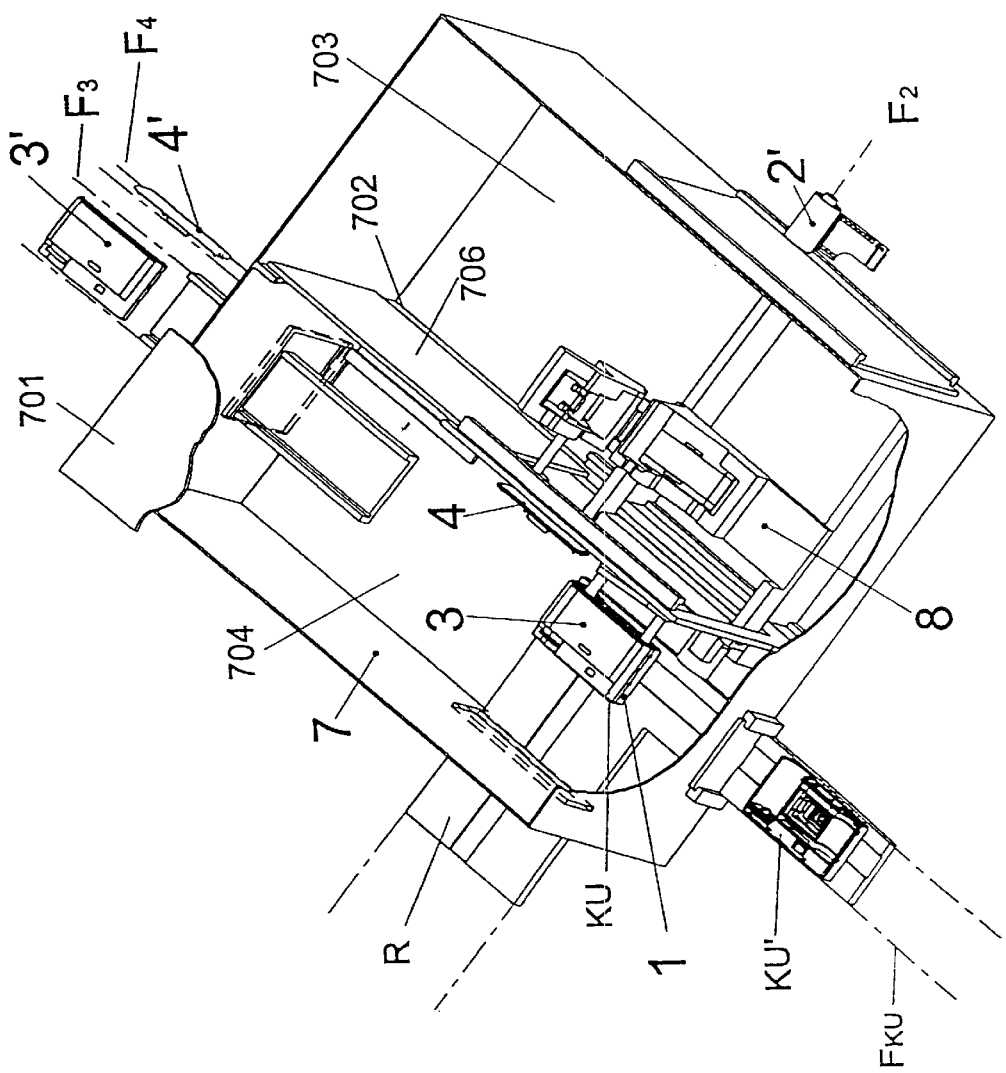
Figure 28:
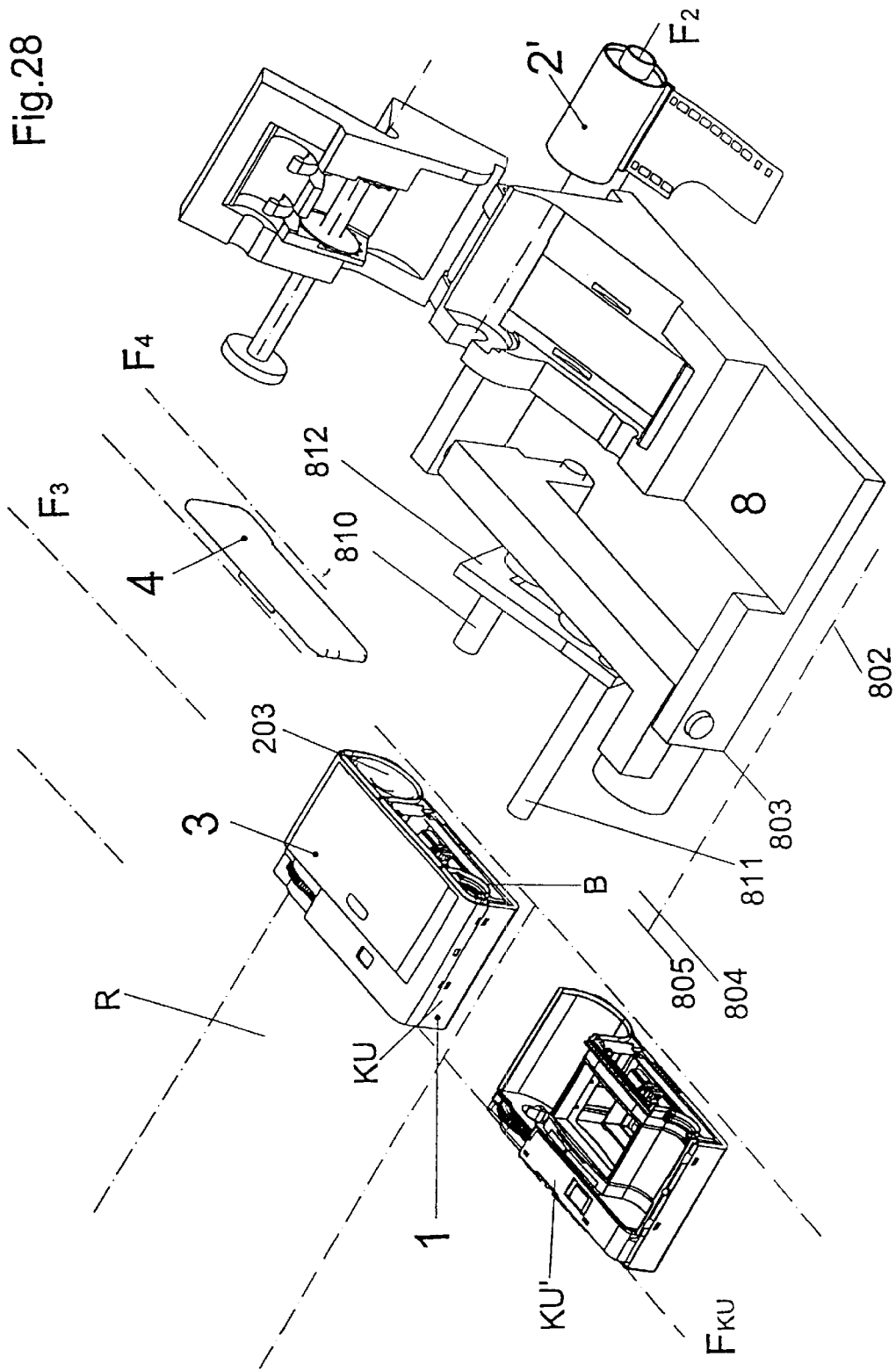
Figure 29:
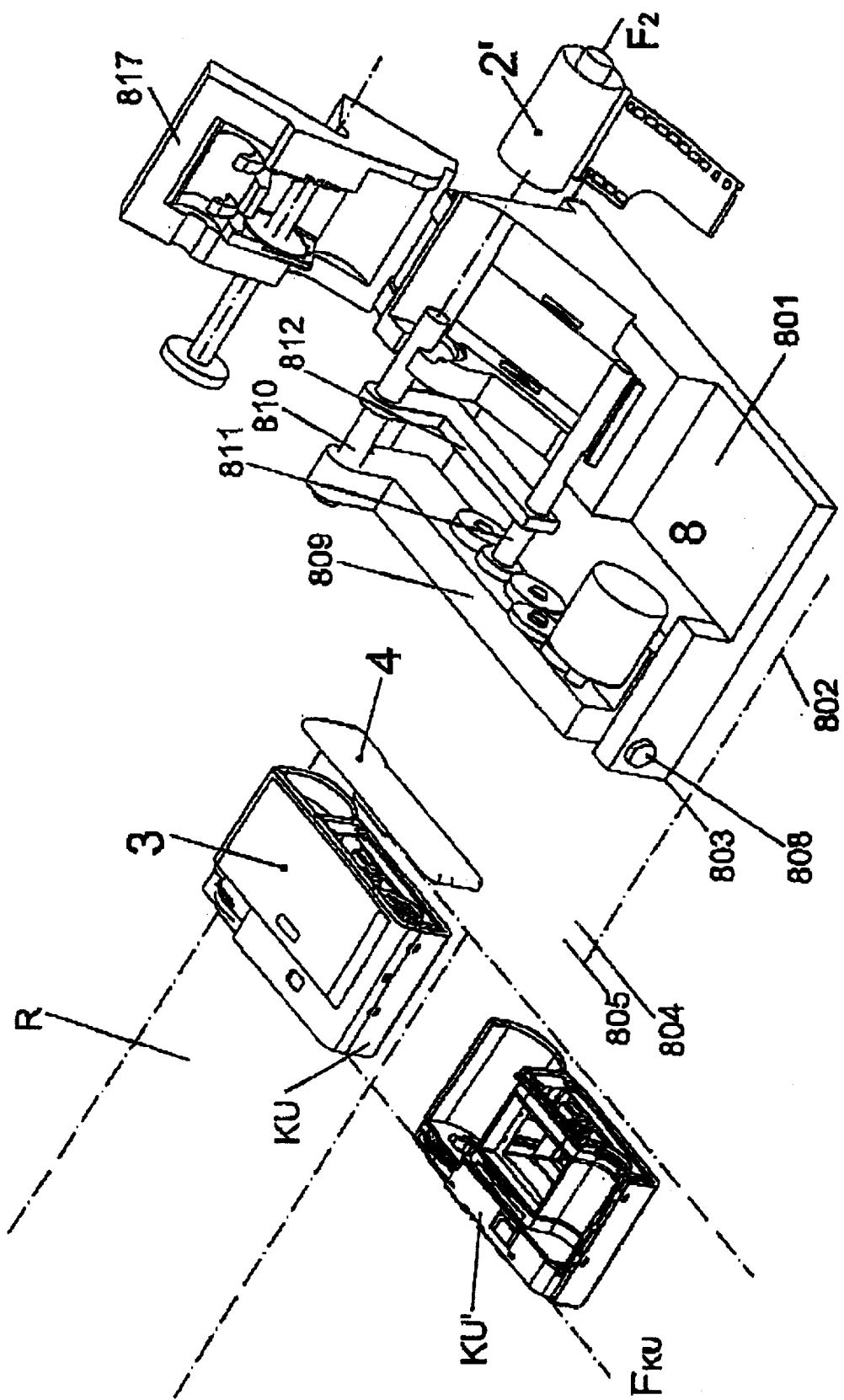
Figure 30:
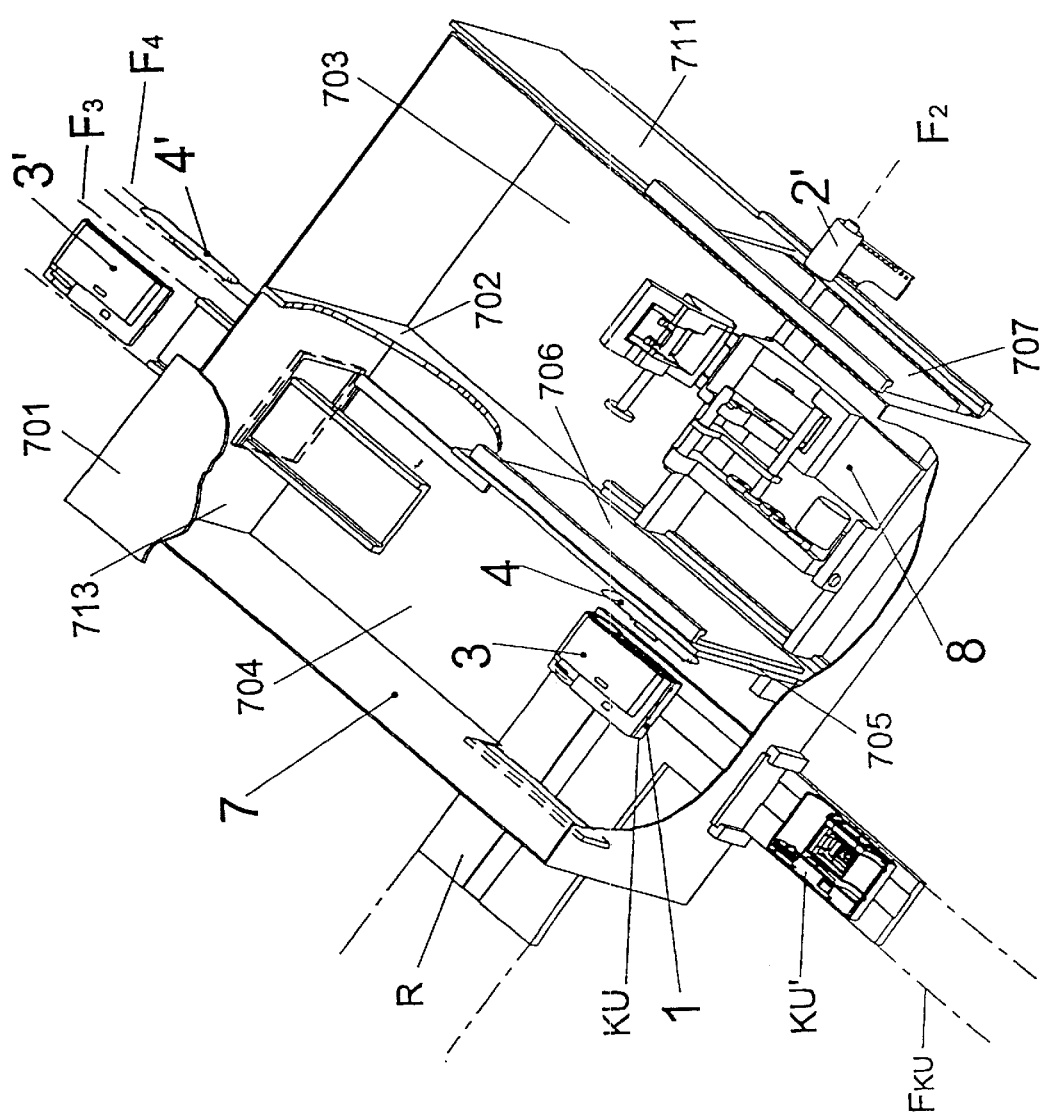
Figure 31:
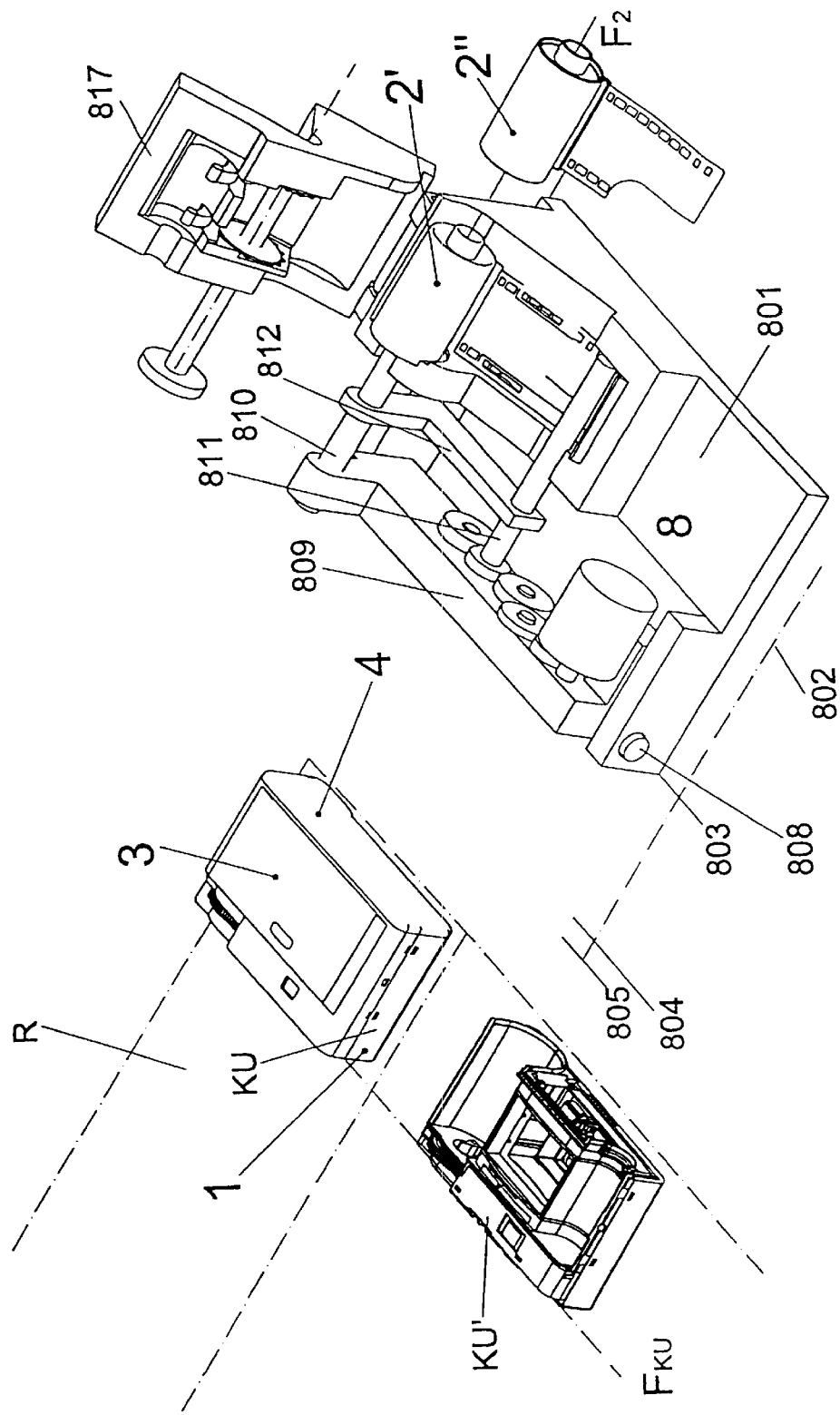
Figure 32:
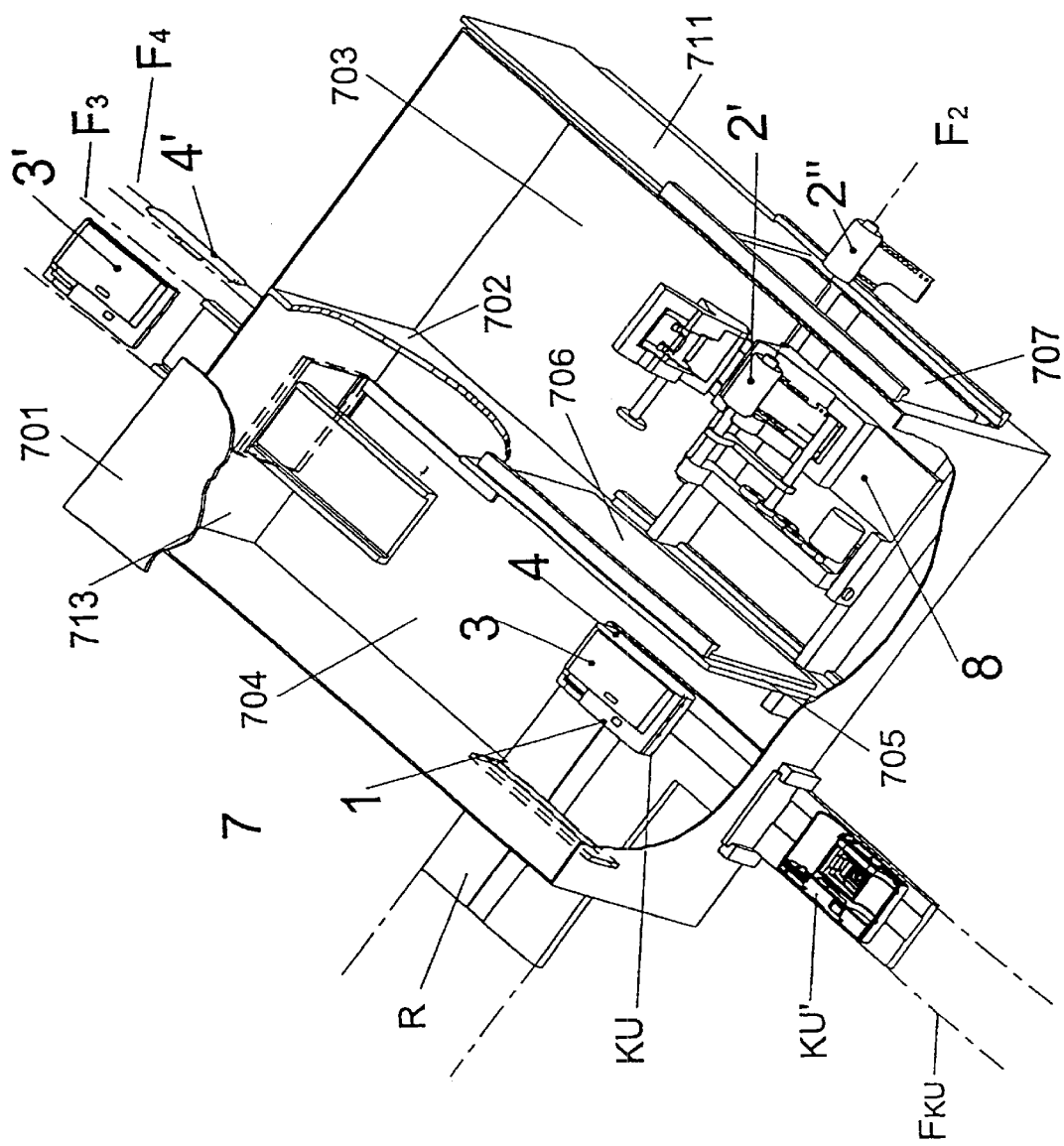

FIG. 25 illustrates the loading apparatus with the film unwinding and film insertion device in the operating state shown in FIG. 24, FIG. 26 illustrates the subject of FIG. 24, after fitting the housing back part to the camera fabrication unit, FIG. 27 illustrates the loading apparatus with the film unwinding and film insertion device in the operating state shown in FIG. 26, FIG. 28 illustrates the film unwinding and film insertion device in the operating state after pulling the push-on spindle and the winding spindle out of the film cartridge and out of the film supply roll, respectively;

FIG. 29 illustrates the film unwinding and film insertion device in the operating state after feeding the housing base part and folding back the support from the push-on spindle and the winding spindle into its initial position, and after moving the film unwinding and film insertion device back into its initial position;

FIG. 30 illustrates the loading apparatus with the film unwinding and film insertion device in the operating state shown in FIG. 29;

FIG. 31 illustrates the film unwinding and film insertion device in the operating state after fitting the housing base part to the camera fabrication unit;

FIG. 32 illustrates the loading apparatus with the film unwinding and film insertion device in the operating state shown in FIG. 31; and FIG. 33 illustrates the film unwinding and film insertion device in the operating state for removing a finished, loaded camera from the loading station of the loading apparatus, in an operating state analogous to the operating state shown in FIG. 16.

A preferred embodiment of the disposable camera, which can be loaded with film by means of the loading apparatus according to the invention, will first be described below with reference to FIGS. 1 to 10a. In FIGS. 1 to 10a, this camera is illustrated in a state in which it is already loaded with a film unit.

Following this, a description will be given, with reference to FIGS. 11 to 33, of the construction and mode of operation of a preferred embodiment of a film loading apparatus according to the invention for loading a disposable camera, of the type of construction shown in FIGS. 1 to 10a, including the construction and mode of operation of a preferred embodiment of a film unwinding and film insertion device of the film loading apparatus.

Construction of the Disposable Camera

The preferred embodiment of a disposable camera which is illustrated in FIGS. 1 to 10a comprises:

a core subassembly 1 comprising devices which are described in greater detail below, for film guidance, for film advance and for film metering, and comprising a taking lens, a viewfinder and a photographic shutter, a photographic film unit 2 which can be inserted in the core subassembly 1 from the back, a housing back part 3 which can be fitted to the core subassembly 1 from the back, and a housing base part 4 which can be fitted to the core subassembly 1 from below, and a housing front part 5 which can be fitted to the core subassembly 1 from the front.

The aforementioned subassemblies 1 to 5 are described in greater detail below. The components of the individual subassemblies are denoted by three-digit reference numerals, the first digit of which denotes the subassembly of which the component forms part.

Film Unit

Before the disposable camera itself is described in detail, the film unit 2 will first be explained. This is contained in the disposable camera in the ready-to-use state thereof and is provided for insertion in the camera by means of the loading apparatus described in detail below.

Figure 1:
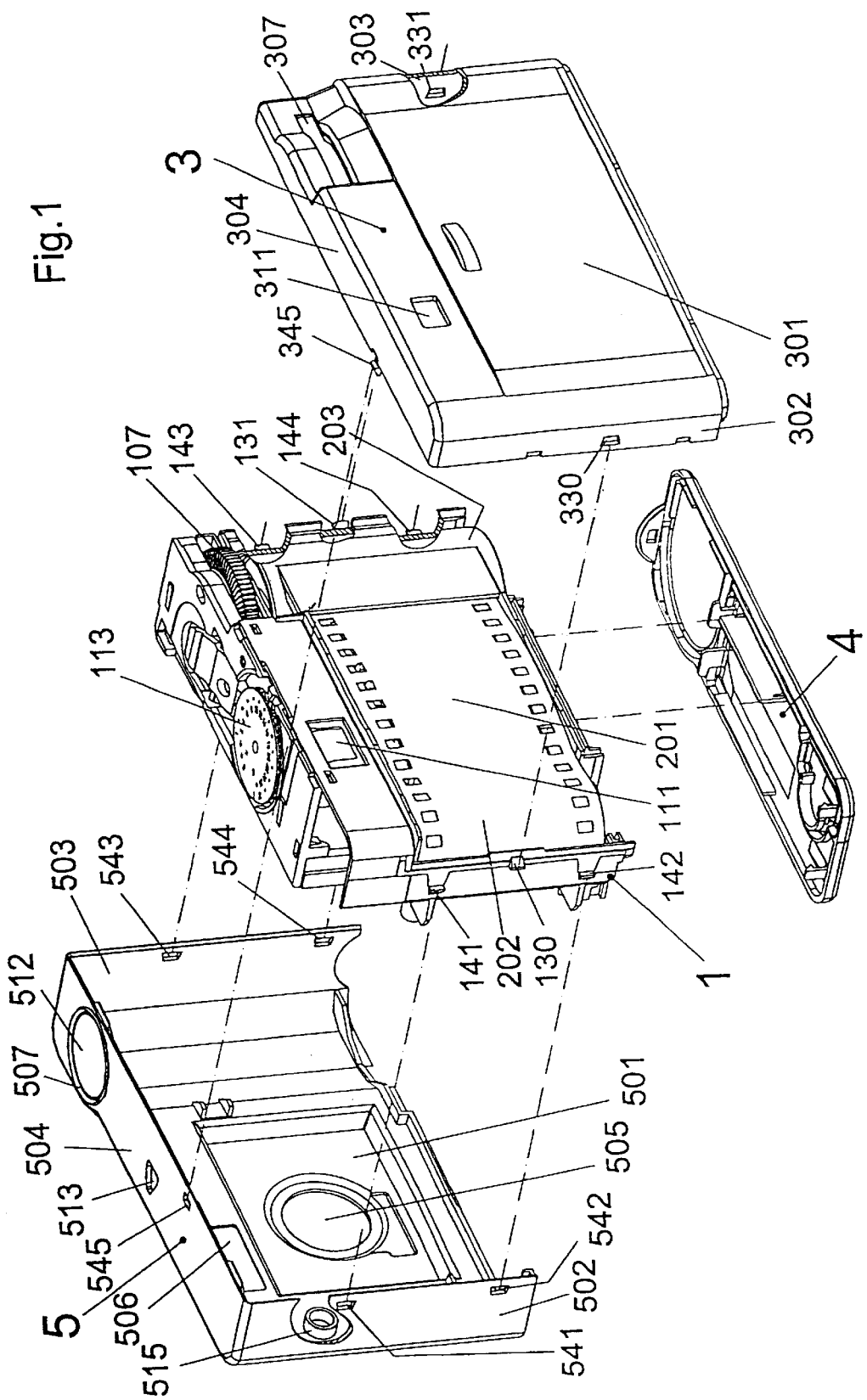
FIG. 1 is an exploded, perspective view, as seen obliquely from behind, of an embodiment of a disposable camera with a photographic film unit inserted therein.
Figure 2:
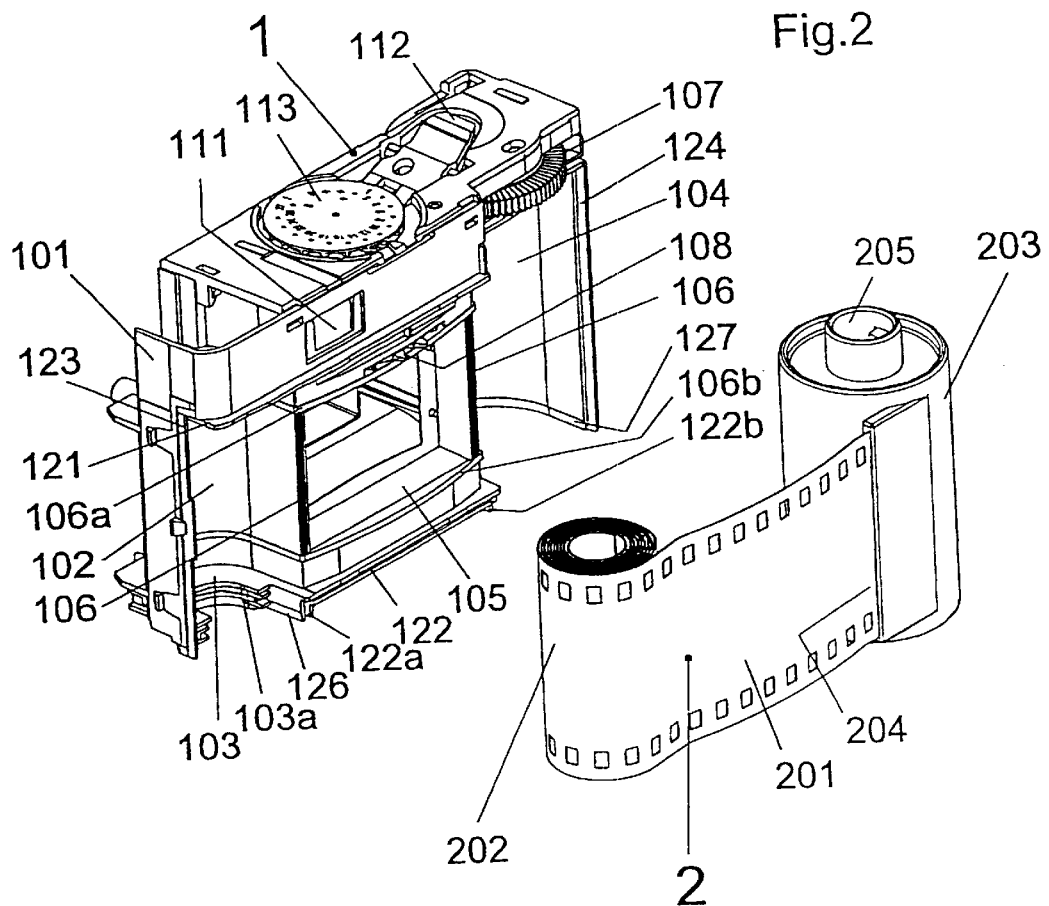
FIG. 2 is an exploded, perspective view, as seen obliquely from behind, of a core subassembly of the camera shown in FIG. 1 and of a photographic film unit inserted therein.
Figure 4:
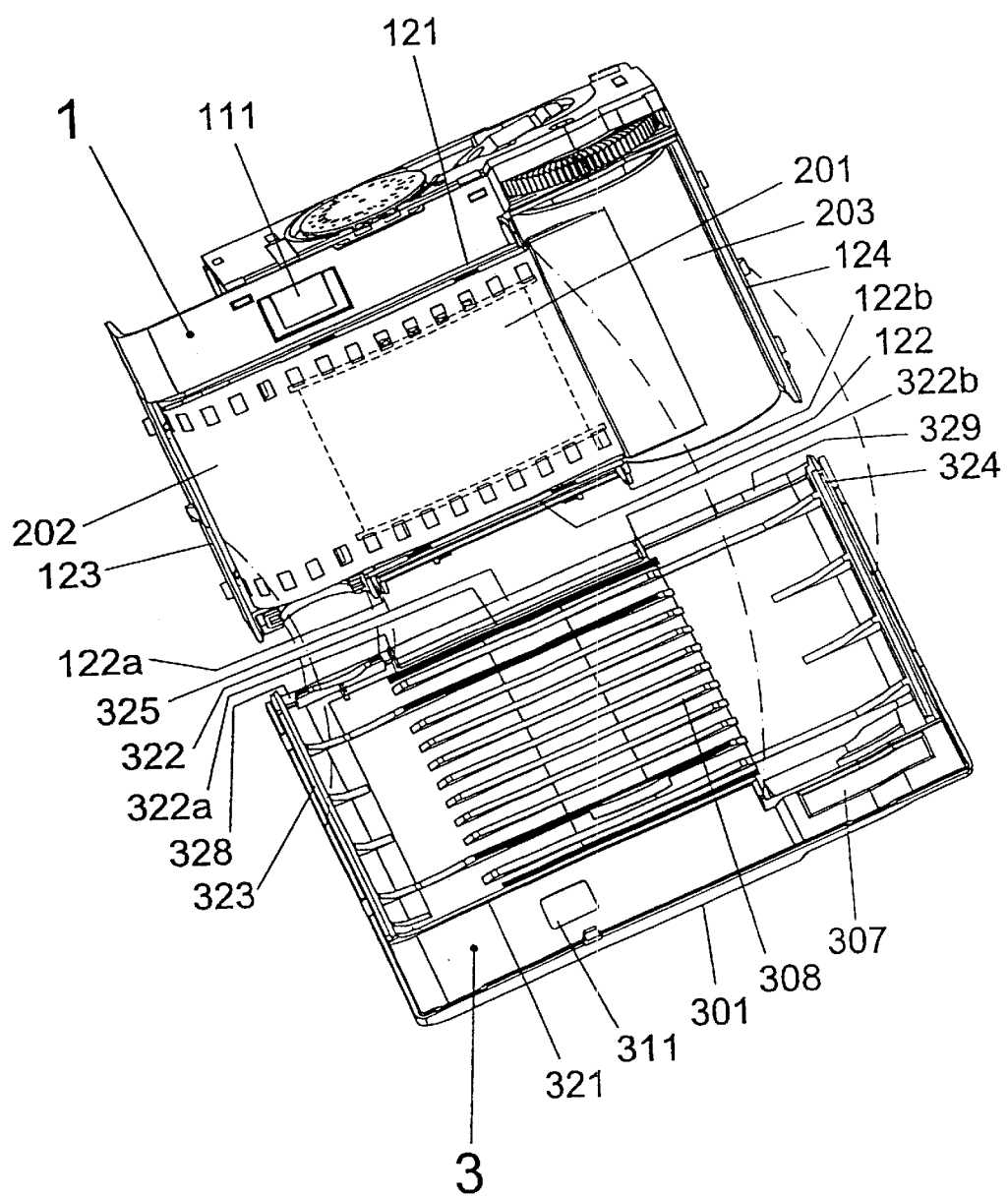
FIG. 4 is a perspective illustration showing the core subassembly as seen from the back and the housing back part shown folded down as seen from within.

The film unit 2 is illustrated in FIG. 2 as an exploded view together with the core subassembly 1, and is shown in FIGS. 1 and 4 after its insertion into the core subassembly 1. The film unit 2 comprises a photographic roll film 201. As can be seen from FIG. 2, one end of the film 201 forms a loose film supply roll 202, whilst its other end passes through a mouth 204 of a film cartridge 203 of a type of construction known in the art and is fixed to a film spool, which is not illustrated but which is rotatably mounted in the interior of the film cartridge 203 and comprises an outwardly projecting coupling part 205 which enables the film spool to be driven by a film advance device of the camera.

In the film unit 2 shown in the drawings, the film 201 and the film cartridge 203, together with the film spool, which is not illustrated, and the coupling part 205 which is attached thereto, are fashioned according to the known "135" small image system for 35 mm roll films. The film 201 accordingly has a continuous perforation at both its edges.

Core Subassembly

The core subassembly 1 is described next. It consists of a main body 101 which is injection moulded in one-piece from a light-tight plastics material. The main body forms a film supply chamber 102 which is open at the back for receiving the film supply roll 202 of the film unit 2, a film cartridge chamber 104 which is open at the back for receiving the film cartridge 203 of the film unit 2, and a light well 105 which is situated between the two chambers 102, 104 and which comprises a window-like film exposure frame 106 which has a slightly convex curvature towards the back in the direction of film advance. The film exposure frame has top and bottom film guidance runners 106a, 106b, against each of which a front side of a film portion of the film 201 is seated between the film supply roll 202 and the film cartridge 203 (see FIG. 8). On its lower, radially inwardly oriented wall element 103, the film supply chamber 102 forms a U-shaped aperture 103a which is open at the back, whilst the film cartridge chamber 104 is completely open at the bottom.

Moreover, a film advance device is inserted in the core subassembly 1. This film advance device is known in principle in the art and is in engagement with the coupling part 205 of the film cartridge 203 of the film unit 2 which is inserted in the core subassembly 1. Of this advance device, only part of a knurled advance wheel 107, which can be operated manually by the user of the camera, is shown in the drawings. Using this film advance device, the film 201 can be pulled off from the film supply roll 202 and can be advanced progressively into the film cartridge 203 via the film exposure frame 106. The film advance device and an associated transport locking device are preferably constructed according to the prior German Patent Application 199 01 578.3 (DE-OS 199 01 578 A1).

Furthermore, the core subassembly 1 is equipped with a film metering device, which is known in principle in the art, for measuring the film length advanced each time. Of this film metering device, only part of a sprocket wheel 108 thereof, which engages in the top film perforation of the film 201, is visible in FIG. 2. The sprocket wheel 108 and the mechanical shifting elements which cooperate therewith are preferably constructed according to the prior German Patent Application 199 01 579.1 (DE-OS 199 01 579 A1).

In addition, a taking lens 109 is a fixed to the front side of the core sub-assembly 1, coaxially with a centre line of the light well 105, and serves for the optical imaging of an object to be photographed on the film section of the photographic film 201 which is situated in the exposure frame 106. Since the exposure frame 106 is curved backwards, the requirements for the correction of imaging errors of the lens 109 are reduced insofar as they relate to image field curvature.

A viewfinder which is provided in the core subassembly 1 serves to identify the region of the object to be photographed which is depicted on the film section of the film 201 which is situated in each case in the region of the film exposure frame 106. The viewfinder consists in the known manner of a viewfinder lens 110 and a viewfinder eyepiece 111, both of which are fixed to the core sub-assembly 1.

A photographic shutter, which is known in principle and which can be actuated by means of a release device, is situated in the path of the light beam behind the taking lens 109 in the core subassembly 1. Of the release device, the drawings only illustrate a swivel-mounted release lever 112, and a flexible release diaphragm 512 which acts on a free end of the release lever 112 and which is fixed to the housing front part 5 which is described in detail below. The photographic shutter and its release device are preferably constructed according to the prior German Patent Application 199 01 577.5 (DE-OS 199 01 577 A1).

Furthermore, a frame counter device which is known in principle is inserted in the main body 101 of the core subassembly 1. The drawings only schematically illustrate a rotatably mounted frame counter wheel 113 of the frame counter device. This is moved on by one counting step when the film is advanced by one frame step. The frame counter device is preferably constructed according to the prior German Patent Application 199 01 576.7 (DE-OS 199 01 576 A1).

A forwardly projecting mounting peg 115 and a thinner mounting pin 116, which is likewise oriented towards the front and the function of which is described in more detail below, are injection moulded on a curved wall 114 of the film supply chamber 102 which is disposed on the front of the main body 101 of the core subassembly 1.

In addition, an elongated cavity 117 is formed on the core subassembly 1 underneath the light well 105. This cavity extends perpendicularly to the optical axis of the taking lens 109 and parallel to the direction of film advance and is sized so that it is capable of receiving an electrical storage capacitor if a flash device is incorporated in the camera, as described in more detail below. Part of this cavity 117 can be seen in section in FIG. 8.

Housing Back Part

The housing back part 3 will be described next. This is again injection moulded in one piece from a light-tight plastics material and is shaped so that it can be fitted to the back of the core subassembly 1 from the back. It comprises an externally flat back wall 301, which is adjoined along its lateral edges and its top edge by side and top wall elements 302, 303, and 304, respectively, which project perpendicularly from the back wall face and which enclose back edge parts of the core subassembly 1. There is no perpendicularly projecting wall element at the bottom edge of the back wall 301, but instead there is merely a small projection 305 which projects perpendicularly to the back wall 301 and which comprises a concave semicircular recess 306, which together with the aperture 103a in the wall element 103 of the film supply chamber 102 of the core subassembly 1 forms an approximately circular aperture B, the function of which is explained in detail below.

On the back wall 301 there is a slot-shaped aperture 307 and a rectangular aperture 311, which when the housing back part 3 is fitted to the core subassembly 1 enable part of the film advance wheel 107 to pass through the core subassembly 1 backwards and which enable the viewfinder eyepiece 111 of the core subassembly to be viewed from the back, respectively. A plurality of film contact pressure ribs 308, which extend parallel to each other in the direction of film advance and which possess a concave curvature, is provided on the inner face of the back wall 301.

Figure 8:
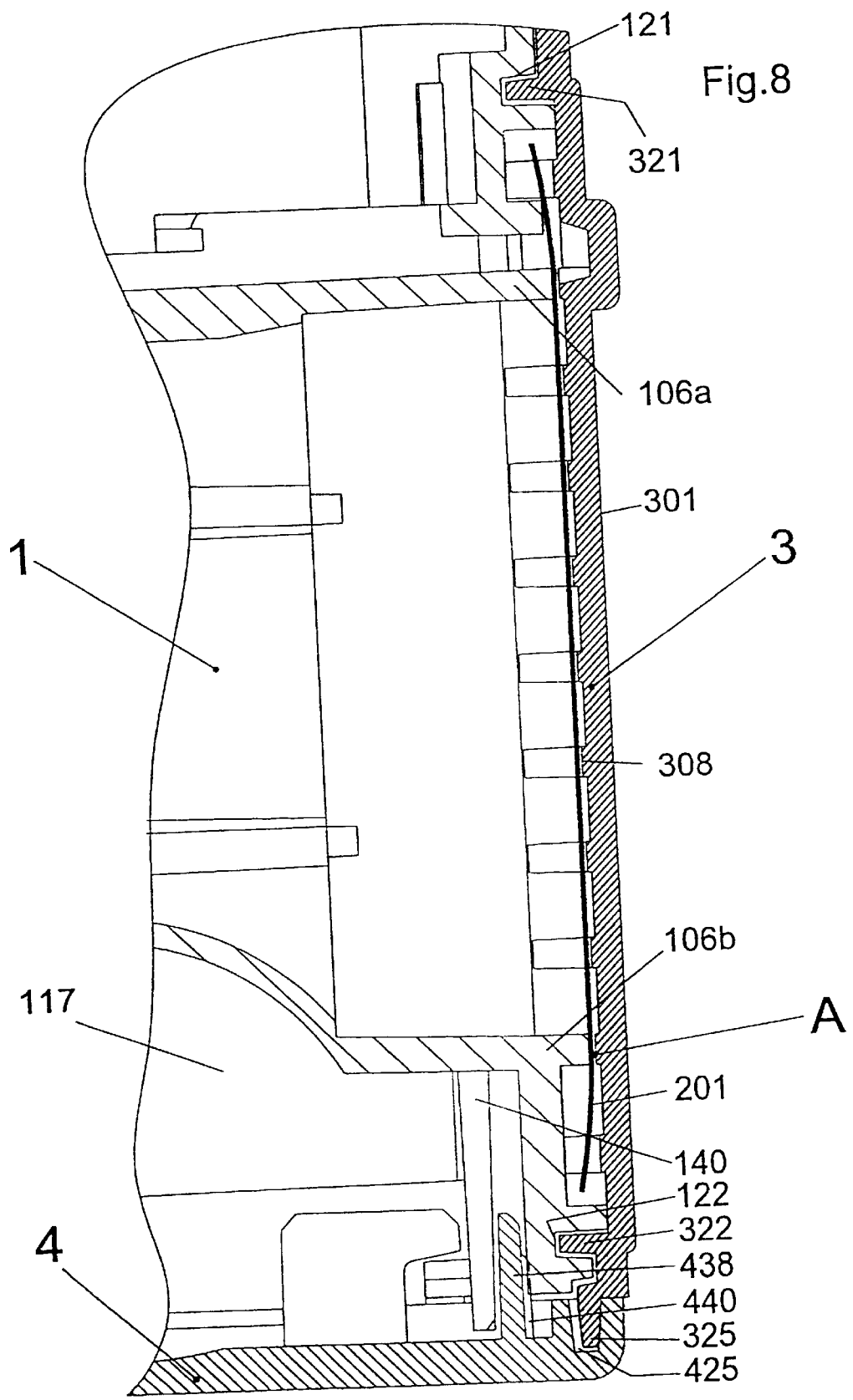
FIG. 8 is a longitudinal section through the parts of the camera shown in FIG. 1, in their assembled state.

When the housing back part 3 is fitted to the core subassembly 1, the inner face of the back wall 301, together with the exposure frame 106 of the core subassembly 1 and the film guidance runners 106a, 106b thereof, forms a film guide channel A which is illustrated in section in FIG. 8, wherein the back of the film 201 is supported in the film guide channel A on the film contact pressure ribs 308 of the housing back part 3.

The housing back part 3 closes off the film supply chamber 102 and the film cartridge chamber 204, as well as the film guide channel A, at the back.

Housing Base Part

The housing base part 4 is described next. This is again injection moulded in one piece from a light-tight plastics material and is shaped so that it can be fitted from below to the underside of the core subassembly 1; this fitting operation is effected separately from the fitting of the housing back part 3 to the core subassembly. The housing base part 4 comprises an externally flat, smooth base wall 401, which on its inner face comprises a film supply chamber covering region 402 for covering the underside of the film supply chamber 102 of the core subassembly 1 and of the film supply roll 202, and which also comprises a film cartridge chamber covering region 404 for covering the underside of the film cartridge chamber 104 of the core subassembly 1 and the film cartridge 203 which is inserted therein. A trough 406 is provided in an intermediate region 405 of the base wall 401 situated between the film supply chamber covering region 402 and the film cartridge covering region 404, and serves to effect a certain downward enlargement of the cavity 117 in the core subassembly 1.

A break-off line 407 for bending the film cartridge chamber covering region 404 out of the plane of the base wall 401 extends in the intermediate region 405, in the vicinity of the film cartridge chamber covering region 404, and is invisible on the outer face of the base wall 401. As described in more detail below, this operation can be performed by inserting a tool in a small aperture 409 which is disposed in an edge region 408 of the base wall 401 adjacent to the film cartridge chamber covering region 404.

A hinge formed from the material of the base wall 401 can also be provided instead of the break-off line 407.

Housing Front Part

The housing front part 5 is described next. This is again injection moulded in one piece from a plastics material, and is shaped to match the external dimensions of the functional unit FU and so that it can be fitted from the front to the front side of the functional unit FU, or, more precisely, to the front side of the core subassembly 1, and so that it adjoins and is flush with the housing back part 3 and the housing base part 4. The housing front part 5 comprises a front wall 501 which is slightly stepped externally, which is adjoined by side and top wall elements 502, 503 and 504 which project perpendicularly to the front wall 501 along the lateral edges and along the top edge thereof, which front edge parts surround the core subassembly 1 and adjoin and are flush with corresponding wall elements 302, 303 or 304 of the housing back part 3. The front wall 501 has apertures 505 and 506, which are disposed coaxially with the taking lens 109 or the viewfinder lens 110 when the housing front part 5 is fitted to the core subassembly 1. Moreover, an aperture 507 for receiving the shutter release diaphragm 512 and the viewing window 513 for reading the number on the frame counter wheel 113 of the core subassembly 1, which frame counter wheel is disposed underneath, are situated on the top wall element 504. A mounting eye 515, in which the mounting peg 115 of the core subassembly 1 fits when the housing front part 5 is fitted to the core subassembly 1, is injection moulded on the inner face of the front wall 501.

Functional Unit and Fabrication Unit

Figure 3:
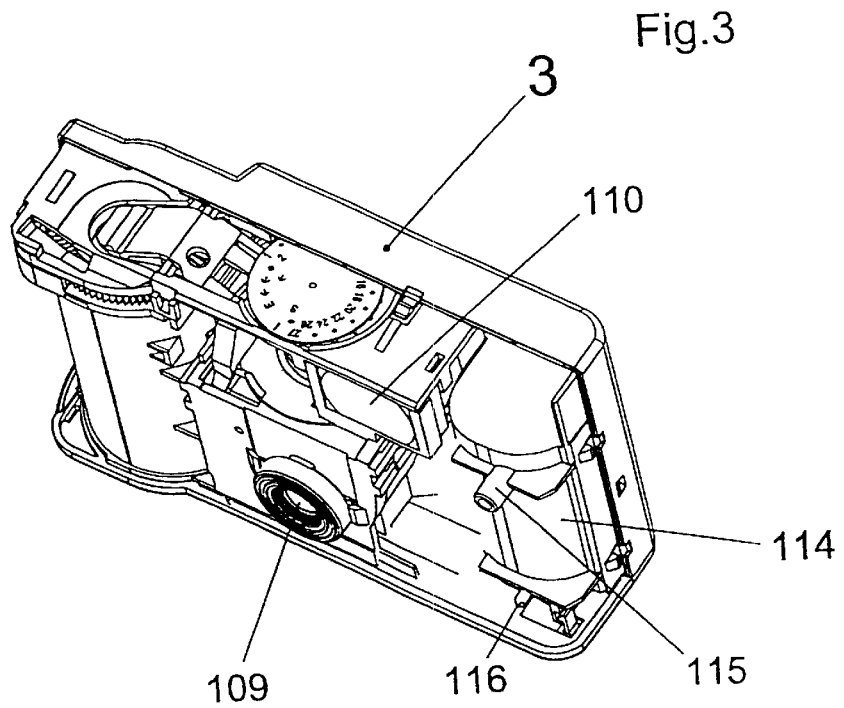
FIG. 3 is an exploded, perspective view, as seen obliquely from the front and the top, of a photographic functional unit which is formed from the subject of FIG. 2 with a housing back part and housing base part fitted thereon.

In their assembled state, the core subassembly 1 with the film unit 2 inserted therein, the housing back part 3 which can be fitted to the core subassembly, and the housing base part 4 which can be fitted to the core subassembly 1 together form the functional unit FU, which is illustrated separately in FIG. 3.

As is explained in more detail below, the functional unit FU forms a light-tight compartment for the photographic film contained therein, and contains all the technical operating devices which are necessary for making a predetermined number of photographic recordings of objects on the film 201 without using a flash. It is only the shutter release diaphragm 512 for actuating the shutter release lever 112 of the core subassembly 1, as well as a viewing window 513 for reading the frame counter on the frame counter wheel 113, which are not located on the functional unit FU, but which are situated on the housing front part 5 instead.

In contrast, the fabrication unit KU of the disposable camera, which unit, together with the film, is loaded into the loading apparatus described in detail below, preferably consists of the core subassembly 1 and of the housing front part 5 which is fitted thereto.

Light-Tight and Similar Joints between Subassemblies

Locking joints are provided between the core subassembly 1, the housing back part 3 and the housing base part 4 of the functional unit FU. These locking joints make contact along predetermined contact lines and are predominantly formed as labyrinth joints in order to screen the film supply chamber 102 and the film cartridge chamber 104 of the core subassembly 1, as well as the film guide channel A which runs between the core subassembly 1 and the housing back part 3 inside the functional unit FU, from unwanted extraneous light coming from the outside. In contrast, a light-tight seal is not necessary between the housing front part 5 and the subassemblies 1, 3 and 4 of the functional unit FU.

The locking joints between the core subassembly 1, the housing back part 3 and the housing base part 4, which are predominantly formed as light-tight joints, are each formed by interlocking elements and are predominantly formed by labyrinth elements which cooperate based on the tongue-and-groove principle.

The following elements are employed to form light-tight joints between the core subassembly 1 and the housing back part 3.

As can be seen from FIGS. 1 and 2, a continuous upper labyrinth groove 121 extends on the back of the main body 101 of the core subassembly 1 over the entire length of the main body 101, and consists of two horizontally extending sections and of a vertically extending section situated therebetween. This corresponds to a correspondingly formed upper labyrinth tongue 321 on the inner face of the housing back wall 301 of the housing back part 3. A lower labyrinth groove 122 extends horizontally on the back of the main body 101 of the core subassembly 1 below the lower film guidance runner 106b, between the film supply chamber 102 and the film cartridge chamber 104, and at its lateral ends has end regions 122a, 122b which extent perpendicularly downwards towards the base. This lower labyrinth groove 122 corresponds to a correspondingly formed lower labyrinth tongue 322 on the inner face of the housing back wall 301, which has corresponding end regions 322a, 322b which extend perpendicularly towards the base.

Labyrinth tongues 123; 124, each of which corresponds to a correspondingly formed labyrinth groove 323 or 324, respectively, on the lateral edges of the housing back part 3, extend over the entire length of the vertical lateral edges of the main body 101. The corresponding labyrinth elements 121 and 321, 122 and 322; and 123, 124 and 323, 324, are aligned so that they interlock with each other when they are moved in relation to each other parallel to the optical axis of the taking lens 109 of the core subassembly 1. When the housing back part 3 is fitted to the core subassembly 1 from the back, i.e. in a direction parallel to the optical axis of the taking lens 109, the corresponding, interlocking labyrinth elements each form light-tight joints between the core subassembly 1 and the housing back part 3.

The following elements are employed to form light-tight joints between the core subassembly 1 and the housing back part 3 on the one hand and the housing base part 4 on the other hand.

As can be seen from FIGS. 1 and 2, a downwardly oriented labyrinth tongue 126, 127 extends on the core subassembly 1 on a bottom edge of the main body 101 between each of the lateral perpendicular labyrinth tongues 123, 124 and the horizontal lower labyrinth groove 122. These labyrinth tongues correspond to the cross-sectional shape of the film supply chamber 102 and of the film cartridge chamber 104 and follow the arcuate bottom edges of these regions. A further, horizontal locking tongue 325 which is oriented downwards towards the base and which extends horizontally and rectilinearly is situated on the housing back part 3 under the labyrinth tongue 322 which is forwardly oriented towards the core subassembly 1. At each of its two ends, this labyrinth tongue continues into labyrinth tongues 328, 329, which comprise adjoining end regions which are bent at right angles and which each extend, rectilinearly and in alignment with the middle locking tongue 325, as far as the perpendicular lateral labyrinth grooves 323 and 324; respectively, and are likewise downwardly oriented.

The following labyrinth grooves, which are each raised and upwardly oriented, are formed on the inner face of the base wall 401 of the housing base part 4: arcuate labyrinth grooves 426, 427 which correspond to the labyrinth tongues 126, 127 on the core subassembly 1, as well as a rectilinear middle locking groove 425 which corresponds to the locking tongue 325 on the housing back part 3, and laterally adjoining labyrinth grooves 428, 429, which are rectilinear but which are bent at right angles at their respective ends, and which correspond to the labyrinth tongues 328, 329 on the housing back part 3. The locking groove 425 and the labyrinth grooves 428 and 429 form an overall groove which extends continuously and rectilinearly and which is only bent at its ends. Moreover, the labyrinth grooves 426 and 428 form a closed groove circuit round the film supply chamber covering region 402 of the base wall 401, whilst the labyrinth grooves 427 and 429 form a closed groove circuit round the film cartridge chamber covering region 404 of the base wall 401. The respective, corresponding locking or labyrinth elements 325 and 425, 126 and 426, 127 and 427, 328 and 428; and 329 and 429, are each aligned so that they interlock with each other when they are moved in relation to each other perpendicularly to the optical axis of the taking lens 109 of the core subassembly 1.

When the labyrinth tongues 126, 127 engage in the labyrinth grooves 426, 427, engagement also occurs between the bent end regions 122a, 122b of the labyrinth groove 122 of the core subassembly 1 and the bent end regions 322a, 322b of the labyrinth tongues 322 of the housing back part 3 in the somewhat widened sections 426a; 427a of the labyrinth grooves 426; 427 of the housing base part 4. In addition, the labyrinth tongue 126 of the core subassembly 1, together with the labyrinth tongue 328 of the housing back part 3 and the end region 122a of the labyrinth groove 122 of the core subassembly 1, the end face of which fits into the labyrinth groove 426, and the end region 322a of the labyrinth tongue 322 of the housing back part 3, form a closed circuit in the closed groove circuit round the film supply chamber covering region 402 of the inner base wall 401 which is formed by the labyrinth groove 426 and the labyrinth groove 428 on the housing base part 4. Similarly, the labyrinth tongue 127 of the core subassembly 1, together with the labyrinth tongue 329 of the housing back part 3 and the end region 122b of the labyrinth groove 122 of the core subassembly 1, the end face of which fits into the labyrinth groove 427, and the end region 322b of the labyrinth tongue 322 of the housing back part 3, form a closed circuit in the closed groove circuit round the film supply chamber covering region 404 of the inner base wall 401 which is formed by the labyrinth groove 427 and the labyrinth groove 429 on the housing base part 4. Due to these locking joints, the film supply chamber 102 and the film cartridge chamber 104 of the core subassembly, as well as the film guide channel A which runs therebetween, are completely screened at the bottom, at the face of the housing base part 4, from extraneous light coming from below.

Apart from the ring-like light-tight seals described above, which encircle the undersides of the film supply chamber 102 and the film cartridge chamber 104 of the core subassembly 1, the labyrinth groove 122 with its downwardly bent end regions 122a, 122b of the core subassembly 1, and the labyrinth tongue 322 with its downwardly bent end regions 322a, 322b of the housing back part 3, also contribute to the screening of the film compartment with its film guide channel A from light coming from below.

The additional engagement of the locking tongue 325 of the housing back part 3 in the locking groove 425 of the housing back part 4 is not in itself necessary in order to effect said screening of the film compartment with its film guide channel A from extraneous light coming from below. However, this locking joint between the locking elements 325 and 425 serves for the mechanical stabilisation of the housing back part 3 in the position shown in FIG. 8, so that the internal width of the film guide channel A in a direction parallel to the optical axis of the taking lens 109 is maintained even if the user of the camera unintentionally exerts pressure from the outside on the housing back part 3.

Figure 6:
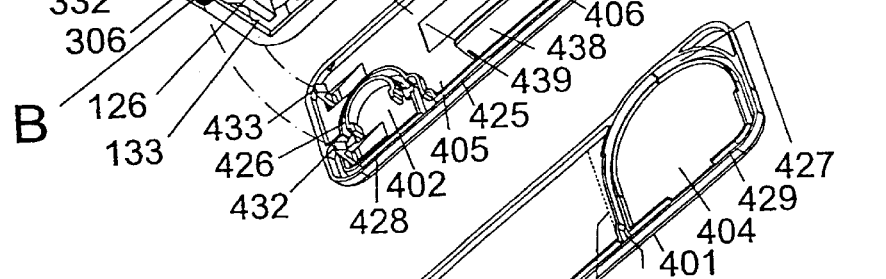
FIG. 6 shows the housing base part in the same perspective illustration as that of FIG. 5, but with the omission of part of the structural elements for the sake of clarity.
Figure 7:
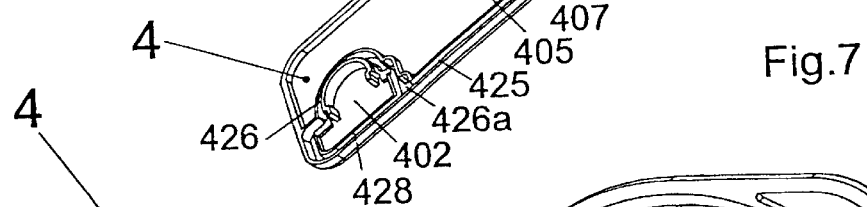
FIG. 7 is an enlarged illustration, as a partial section seen from the top right, of the housing base part shown in FIG. 5.
Figure 7:
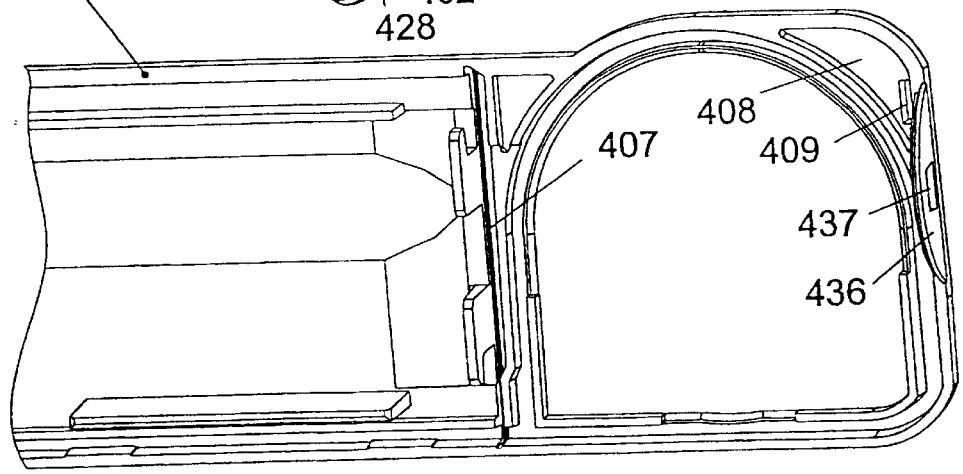

The regions 405 and 408 on the inner face of the base wall 401 of the housing base part 4 which is illustrated in a simplified manner in FIG. 6, and the cavity 117 above them which is formed on the core subassembly 1, are not protected from incident light from the outside. This is not a problem, however, because the film compartment in the camera, which was described above, is sealed from interfering extraneous light by the aforementioned light-tight joints. Therefore, it is also possible for the aperture 409 for prising open the film cartridge chamber covering region 404 of the housing base part 4, which is illustrated in FIG. 7 only, to be disposed in region 408 of the baseplate 401, since extraneous light from the outside which is incident through this aperture 409 cannot enter the film compartment of the functional unit FU.

As a modification of the embodiment described above, the mutually corresponding, interlocking grooves and tongues in the locking and labyrinth joints described above can also be provided in a mutually interchanged arrangement.

As a result of the sealing of the film compartment which was described above, the housing front part 5 does not need to cons is of a light-tight material and the joints between the housing front part 5 and the functional unit FU do not need to be light-tight.

Locking and Clamping Joints Between Subassemblies

In order to fix the housing back part 3 to the core subassembly 1, a locking tab 130, 131 is provided on each of the side faces of the main body 101 of the core subassembly 1, whilst a locking aperture 330 or 331 is formed on each of the lateral, somewhat elastic wall elements 302, 303 of the housing back part 3. When the housing back part 3 is fitted to the core subassembly 1, the locking tabs 130, 131 of the core subassembly 1 engage in the locking apertures 330 or 331 of the housing back part 3, which results in a stable mechanical joint between the core subassembly 1 and the housing back part 3.

In order to fix the housing base part 4 to the core subassembly 1 and to the housing back part 3, locking apertures 133, 134 and 135 are provided on the underside of the main body 101 of the core subassembly 1, and a locking aperture 332 is provided on the housing back part, whilst two pairs of corresponding, upwardly projecting locking tongues 432, 433; 434, 435 are formed on the inner face of the base wall 401 of the housing base part 4. In addition, a locking tab 137 is provided on the core subassembly 1 on the side of the film cartridge chamber 104, whilst a corresponding locking aperture 437 is formed on the housing base part 4, on a lateral tab 436. When the housing base part 4 is fitted to the core subassembly 1 and to the housing back part, the locking tongue 432 of the housing base part 4 engages in the locking aperture 332 of the housing back part 3, whilst the locking tongues 433, 434 and 435 of the housing base part 4 engage in the locking apertures 133, 134 or 135 of the core subassembly 1. The locking tab 137 on the core subassembly 1 engages in the locking aperture 437 on the housing base part 4. This results in a stable mechanical joint between the core subassembly 1 and the housing back part on the one hand and the housing base part 4 on the other hand.

In order to provide further stabilisation, a clamping rib 438, which projects upwards from the base wall 401 and which comprises lateral clamping projections 439, 440, is provided on the housing base part 4 near the film guide channel. When the housing base part 4 is fitted to the core subassembly 1, these clamping projections are pushed between two angled guide projections 139, 140 situated on the core subassembly, so that an additional clamped joint is formed between the housing back part 3 and the core subassembly 1.

In order to fix the housing front part 5 to the core subassembly 1, a pair of locking tabs 141, 142 and 143, 144 is provided in each case on both sides of the core subassembly 1, whilst a pair of corresponding locking apertures 541, 542 or 543, 544 is provided on each of the sidewalls of the housing front part 5. In addition, a locking tab 345 is formed on the housing back part 3 and a corresponding locking aperture 345 is formed on the housing front part 5. When the housing front part 5 is fitted to the functional unit FU, the corresponding locking elements 345, 545 interlock.

As a modification of the embodiment described above, the mutually corresponding, interlocking locking tabs and locking apertures in the locking joints described above can also be provided in a mutually interchanged arrangement.

Assembly of the Disposable Camera

As follows from the above description, assembly of the functional unit FU is effected in the following steps:

providing the core subassembly 1;

inserting a film unit 2 in the core subassembly 1 from the back thereof so that the film supply roll 202 is received by the film supply chamber 102 and the film cartridge 203 is received by the film cartridge chamber 104, and so that a film portion of the film 201 between the film supply roll 202 and the film cartridge 203 is seated against the film guidance runners 106a, 106b of the exposure frame 106;

fitting the housing back part 3 to the core subassembly 1 from the back in the direction of the optical axis of the taking lens 109 of the core subassembly 1; and fitting the housing base part 4 to the core subassembly 1 from below in a direction perpendicular to the lens axis of the taking lens 109.

In this process, the main body 101 of the core subassembly 1, the housing back part and the housing base part 4 are each in one piece, and the housing base part 4 is fitted separately from the housing back part 3 to the main body 101 of the core subassembly 1.

Figure 5:
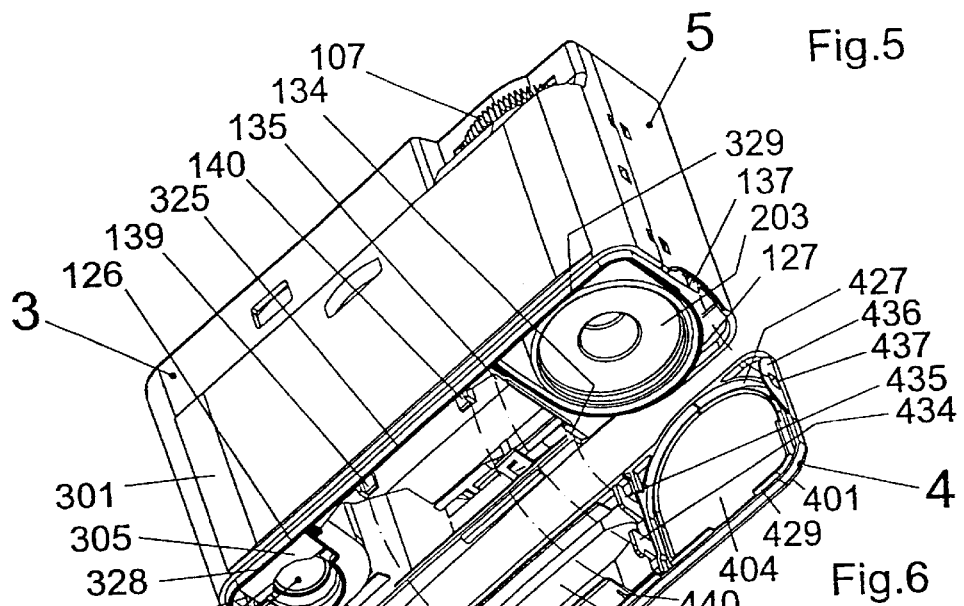
FIG. 5 is a perspective illustration, as seen obliquely from the back and from below, of the camera shown in FIG. 1, with the housing back part and the housing front part fitted to the core subassembly, and includes a separate illustration of the housing base part in its folded down position.

As mentioned above, when the housing back part 3 is fitted to the core subassembly 1 the recess 306 in the projection 305 of the housing back part 3 complements the U-shaped, semicircular recess 103 which is open at the back on the projection 103 of the film supply chamber 102 of the core subassembly 1 to form the approximately circular aperture B, as shown in FIG. 5. The aperture B which is thereby formed is approximately coaxial with a centre line of the film supply chamber 102 and with a centre line of the film supply roll 202 of the film unit 2 which is inserted therein, and its diameter is significantly less than the diameter of the film supply chamber 102. If a winding spindle, which is not illustrated, is used as an auxiliary tool to form the film supply roll 202 before the camera is assembled, then as a consequence of the formation of the aperture B in the film supply chamber 102 of the core subassembly 1 said spindle can remain in the film supply roll 202 when the film supply roll 202 is inserted in the film supply chamber 102 of the core subassembly 1 and during the subsequent fitting of the housing back part 3 to the core subassembly 1, so that it can be ensured that the film supply roll 202 does not unwantedly "run out" until the film supply chamber 102 is closed at the back by fitting the housing back part 3. After the housing back part 3 has been fitted to the core subassembly 1, the winding spindle can then be pulled out through the aperture B. Subsequent loosening of the film supply roll 202 is then only possible to a limited extent due to the closure of the film supply chamber 102 at the back by the housing back part 3, and therefore cannot cause any problems. When the winding spindle of the film supply roll 202 is pulled off, one edge of the latter is seated against the projections 103 and 305, and therefore cannot be entrained by the winding spindle when the latter is pulled off, even if there is still frictional engagement between the winding spindle and the innermost winding of the film supply roll 202 when the winding spindle is pulled off.

During the assembly of the subassemblies 1, 3 and 4 which was described above, the light-tight film compartment which was described in detail above is formed in the functional unit FU, and comprises the film supply chamber 102 and the film cartridge chamber 104 of the core subassembly 1, and the film guide channel A which is formed between these two chambers and between the core subassembly 1 and the camera back part 3.

The functional unit FU which is illustrated in FIG. 3 contains all the components which are necessary for the light-tightness and operation of the camera, with the exception of the shutter release diaphragm 512 and the frame counter aperture 513, which are disposed on the housing front part 5. The functional unit FU therefore performs all the technical functions for the photographic recording of images, practically in the same way as a complete camera without a flash device.

Figure 9:
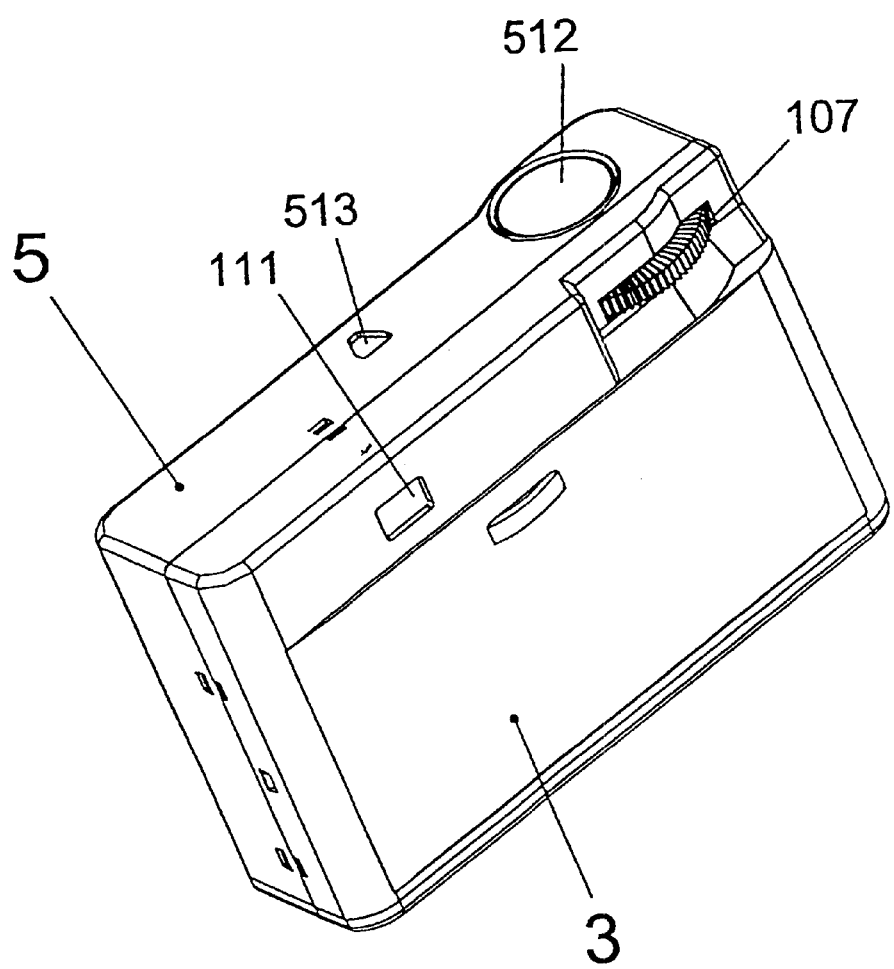
FIG. 9 is a perspective illustration, as seen obliquely from above, of the camera shown in FIG. 1 in its completely assembled state.
Figure 10:
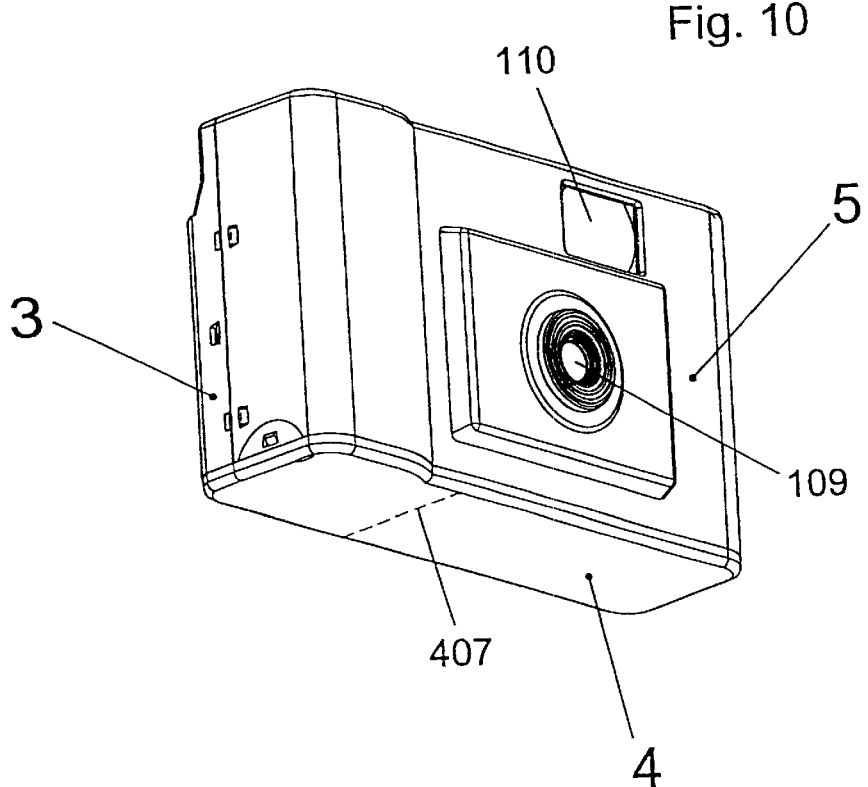
FIG. 10 is a perspective illustration, as seen obliquely from below, of the camera shown in FIG. 1 in its completely assembled state.
Figure 10A:
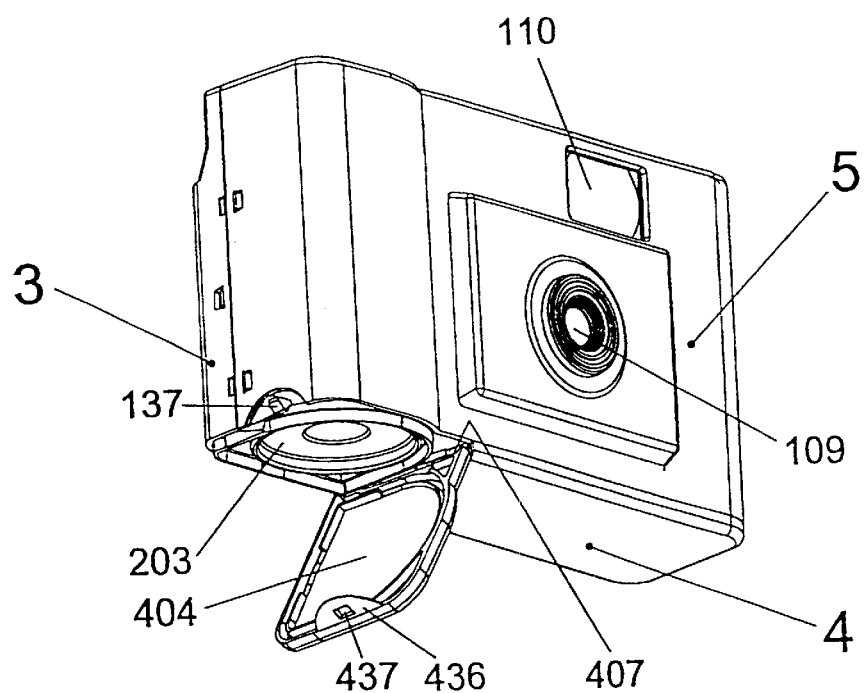
FIG. 10a illustrates parts of the camera shown in FIG. 10, in which a film cartridge chamber covering region of the housing base part is folded down in order to remove the film cartridge.

As shown in FIG. 9, the functional unit FU is completed to form a camera with an external housing which is closed all round, without additional technical functions being created by fitting the housing front part 5, apart from the possibility of actuating the shutter release lever 112 of the functional unit FU by the shutter release diaphragm 512 of the housing front part 5 and apart from making it possible to read the number on the frame counter wheel 113 of the core subassembly 1 through the viewing window 513 of the housing front part 5. Therefore, the housing front part 5 is essentially employed only to complete the overall housing of the camera which is formed from the housing back part 3, the housing base part 4 and the housing front part 5, without contributing further to the light-tightness and operation of the camera (apart from the shutter release diaphragm and frame counter window).

The housing front part 5 can optionally be fitted to the functional unit FU either before or after the fitting of the housing back part 3 and/or of the housing base part 4 to the functional unit 1 from the front.

Film Loading Apparatus

A film loading apparatus 7 (hereinafter sometimes called simply a "loading apparatus") comprising a film unwinding and film insertion device 8 is described in detail below with reference to FIGS. 11 to 33. The film loading apparatus 7 is designed for the preparation of film units of the type illustrated in FIG. 2, with which disposable cameras of the type of construction shown in FIGS. 1 to 10a are loaded as camera fabrication units KU in a state in which they are not yet completely assembled, for the loading operation, for the subsequent insertion of these prepared film units in the camera fabrication units and for the closure of each of the camera fabrication units, which are loaded with film, by supplying further camera subassemblies and for the completion thereof to form complete disposable cameras.

In the course of this process, the cameras of a batch which are to be loaded with film are fed to the film loading apparatus 7 in the form of their core subassemblies 1 to which the respective housing front part 5 has preferably already been fitted previously. Each of these core subassemblies 1, together with the housing front part 5 which is fitted thereto, forms a camera fabrication unit KU, as has already been mentioned above in the section entitled "functional unit and fabrication unit".

Figure 11:
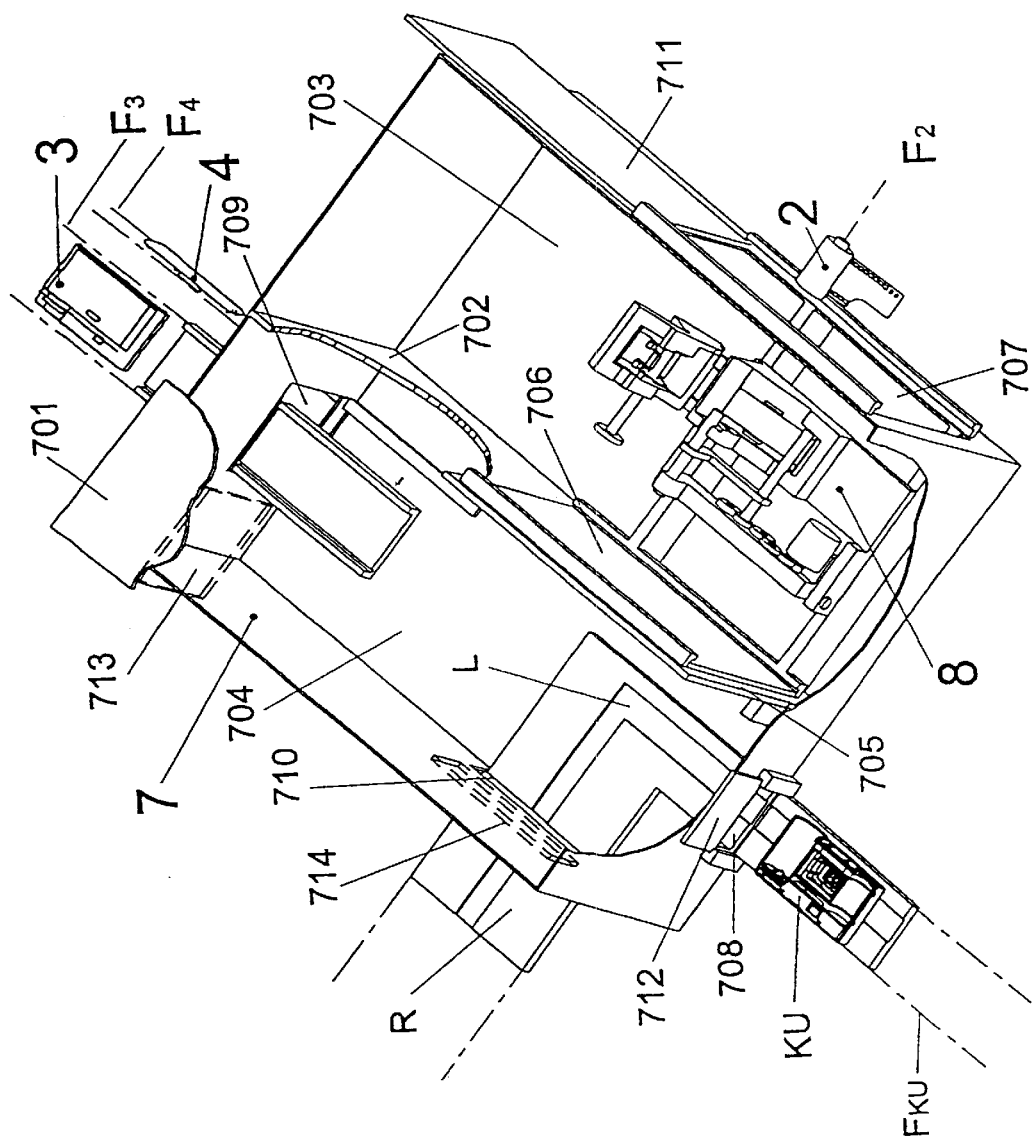
FIG. 11 is a perspective illustration of a loading apparatus for loading a disposable camera, of the type of construction shown in FIGS. 1 to 10a, with a photographic film unit, in its state before it is put into operation.

The film units 2 which are fed to the loading apparatus preferably correspond to the 135 small image system, and are used in the state in which they are usually supplied commercially by the film manufacturer, i.e. with a film leader section 201a which protrudes from a film cartridge 203, as illustrated FIG. 11 for example.

Construction of the Film Loading Apparatus

The film loading apparatus 7, which is illustrated in FIG. 11 and in the subsequent Figures, preferably has a cuboid-shaped loading housing 701 which surrounds a working space which can be closed on all sides to form a light-tight closure. In FIG. 11 and in the following Figures, most of one sidewall of the loading housing 701 has been broken away to provide a view into the interior of the loading housing 701. The same applies to the cover plate of the loading housing 701, most of which has been broken away in FIG. 11 and in the further Figures.

The camera fabrication units KU are fed to the loading housing 701 on a feeder track $F_{KU}$, whilst the film units 2 are fed to the loading housing 701 on a feeder track $F_2$. The housing back parts 3 and the housing base parts 4 of the individual cameras are each fed to the loading housing 701 on separate feeder tracks $F_3$ and $F_4$, respectively.

After inserting the respective film unit and completing the assembly of the respective camera, the latter is discharged from the film housing 701 on a discharge track R. The feeder tracks $F_{KU}$, $F_2$, $F_3$ and $F_4$ each possess motor-driven conveying devices, which are not illustrated, for automatically conveying these objects, which are each placed on conveying devices, progressively towards the loading housing 701 and into the loading housing 701. Similarly, the discharge track R has a motor-driven device, which is not illustrated, for automatically conveying the cameras progressively out of the loading housing 701.

The camera fabrication units, film units, housing back parts and housing base parts which are fed in succession on their respective feeder tracks are denoted by KU, KU', KU", etc., 2, 2', 2" etc., 3, 3', 3" etc. and 4, 4', 4" etc., respectively.

The working space which is enclosed by the loading housing 701 of the film loading apparatus 7 is subdivided into a first chamber 703 and a second chamber 704 by a partition wall 702 which is shown partly broken away in the drawings. The partition wall 702 has an aperture 705 which is provided in order to form a light-tight closure with a lock gate 706 which is displaceably disposed on the partition wall 702.

The first chamber 703 contains a film unwinding and film insertion device 8 which is described in detail below, whilst the second chamber 704 contains a film loading station L (hereinafter sometimes simply called a "loading station") which is described in detail below.

The feeder track $F_2$ for the film units 2 passes from the outside through an aperture 707 in a sidewall of the loading housing 701 into chamber 703 and runs perpendicularly to the feeder track $F_{KU}$. The feeder tracks $F_{KU}$, $F_3$ and $F_4$ for the camera fabrication units KU, the housing back parts 3 and the housing base parts 4 of the cameras run parallel to or in opposite directions to each other and pass through apertures 708, 709 disposed in other opposite sidewalls of the loading housing 701 into the chamber 704. Aperture 709 serves for the simultaneous passage of a housing back part 3 and a housing base part 4. Discharge track R runs out of chamber 704, perpendicularly to the aforementioned feeder tracks, through a further aperture 710 disposed in another sidewall of the loading housing 701.

The aforementioned apertures 707, 708, 709 and 710 can be closed in a light-tight manner by lock gates 711, 712, 713 and 714, respectively, which are associated with each of them and which are displaceably mounted on the respective sidewalls of the loading housing 701. A swivelling mounting can also be provided instead of the displaceable mounting of the lock gates.

The aforementioned lock gates 711 to 714, and also the lock gate 706 on the partition wall 702 of the loading housing 701, can be automatically opened and closed by electric motors or solenoids, which are not illustrated.

Construction of the Film Unwinding and Film Insertion Device

The film unwinding and film insertion device 8, which is disposed in chamber 703 of the film loading apparatus 7, is a main part of the film loading apparatus 7. In order to load the camera fabrication units KU, KU' etc. which are fed in succession on the feeder track $F_{KU}$ to chamber 704 of the film loading apparatus 7, the film units 2, 2' etc. are fed in a successive sequence on the feeder track $F_2$ to chamber 703 of the film loading apparatus 7 and are fed therein to the film unwinding and film insertion device 8, as is described in detail below.

The film unwinding and film insertion device 8 of the film loading apparatus 7 is illustrated separately and on an enlarged scale, partly in perspective and partly in section, in FIG. 12 and in the following Figures, wherein the illustrations of the film unwinding and film insertion device 8 in successive Figures of the drawings show successive steps of an operating cycle of the loading apparatus 7 which correspond to successive operating states. In the Figures which illustrate the film unwinding and the film insertion device 8 separately, parts of the film units 2, camera fabrication units KU, housing back parts 3 and housing base parts 4 are also illustrated to provide a better understanding, and are shown partly with and partly without the respective feeder tracks of the loading apparatus 7, and without other associated parts of the loading apparatus 7 which is illustrated in FIG. 11.

The film unwinding and film insertion device 8 which is illustrated in its initial state in FIG. 12 comprises a baseplate 801, and can be displaced to and fro inside chamber 703 of the loading apparatus 7, in a manner which is described in detail below, along a path of displacement 802, which is merely schematically illustrated by a dashed line in FIG. 12 and in the further Figures, between an initial position, an intermediate position and a final position in relation to the loading station L of chamber 704. This is effected by an electric motor drive, which is not illustrated. The aforementioned positions are indicated symbolically in the drawings by the lines 803, 804 and 805, respectively, which are marked on the path of displacement 802.

A side plate 809 is situated on the baseplate 801 on a pivot pin 808 disposed between two bearing blocks 806, 807. In its initial position shown in FIG. 12, the side plate projects upwards from and at right angles to the baseplate 801, and can be swivelled downwards about its axis 808 by about 180°. This swivelling movement is effected by a further drive motor which is not illustrated. The pivot pin 808 extends perpendicularly to the path of displacement 802 of the baseplate 801 and parallel to a plane which is determined by the backwardly facing back of the core subassembly 1 of the camera fabrication unit KU which is positioned in the loading station L.

A film cartridge push-on spindle 810 (hereinafter abbreviated to push-on spindle) is fixedly disposed on the side plate 809, whilst a film take-up spindle 811 (hereinafter abbreviated to winding spindle) is movably disposed on the side plate 809 so that it can rotate about its own axis and can swivel about an axis of the push-on spindle 810. An elbow lever 812 is employed for this purpose, one arm of which is swivel-mounted on the axis of the push-on spindle 810, and which has a pivot bearing for the winding spindle 811 on its other arm. A base part of the push-on spindle 810 rests in a forked bearing 813, which is fixedly disposed on the baseplate 801 and is employed for pushing on a film cartridge 203 of a film unit 2 of the type shown in FIG. 2, which is fed towards it on the feeder track $F_2$. The winding spindle 811 is employed to form a film supply roll 202 as shown in FIG. 2 from a longer part of the photographic film 201 of the film unit 2 which is advanced out of the film cartridge 203.

The push-on spindle 810 and the winding spindle 811 are parallel to each other. In the operating state illustrated in FIG. 12, in which the side plate 809 projects perpendicularly upwards and the elbow lever 812 is aligned in its non-swivelled initial position with its arm which bears the winding spindle 811 parallel to the plane of the baseplate 801, the plane which is determined jointly by the push-on spindle and by the winding spindle is inclined at about 30° to the plane of the baseplate 801, wherein the winding spindle 811 is at a lesser distance than is the push-on spindle 810 from a plane which is determined by the pivot pin 808 and which is parallel to the plane of the baseplate 811. In contrast, the plane determined by the push-on spindle 810 and the winding spindle 811 is approximately parallel to the plane of the baseplate 801 when the elbow lever 812 is swivelled about the axis of the push-on spindle 810.

In order to pull the film out of the film cartridge 203 which is pushed on to the push-on spindle 810, and in order to form the film supply roll 202 on the winding spindle 811, a film advance device is employed which is described in detail below.

The film advance device comprises a film guide plate 814 which is fixed to the baseplate 801 and which comprises a film guide face 815 which extends between the push-on spindle 810 and the winding spindle 811 and which is therefore also inclined at an angle of about 30° to the baseplate 801. A leader section 201a of the photographic film 201 of the film unit 2 which is contained in the film cartridge 203, which leader section protrudes from the film cartridge 203, comes to rest on the film guide face when the respective film unit 2 with the film cartridge 203, in the state of supply in which it is usually supplied by the manufacturer of the film, is pushed on to the push-on spindle 810.

The inclined film guide face 815 of the film guide plate 814 extends at its lower end into a film roll formation face 816 which exhibits concave curvature, which is approximately half-moon shaped in section, and which forms a hollow, approximately cylindrical half shell, as can be seen in particular from FIG. 16.

Figure 12:
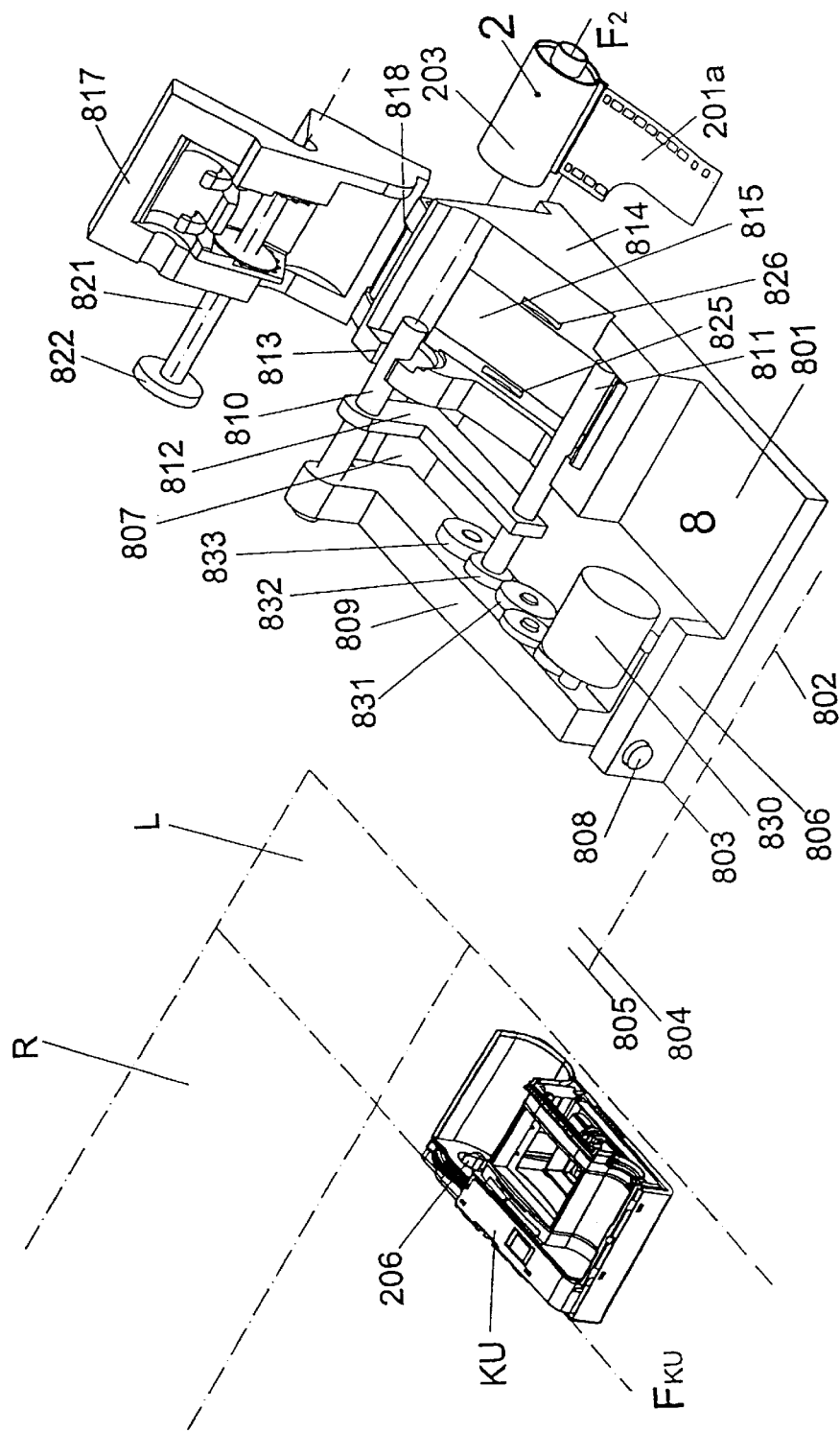
FIG. 12 is a perspective illustration, on an enlarged scale, of a film unwinding and film insertion device of the loading apparatus shown in FIG. 11.
Figure 14:
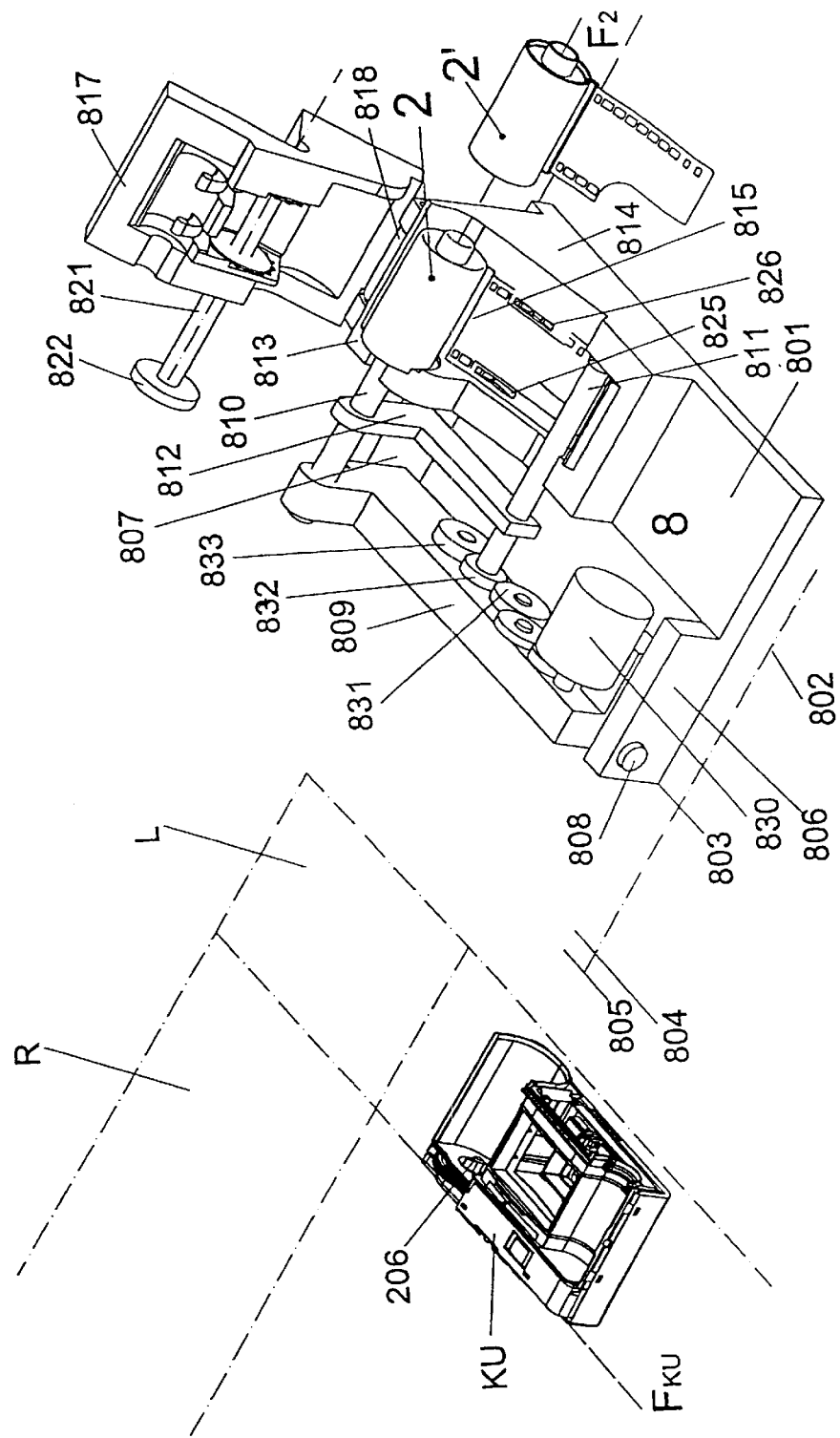
FIG. 14 is a perspective illustration of the film unwinding and film insertion device of the loading apparatus, in the operating state as shown in FIG. 13.
Figure 17:
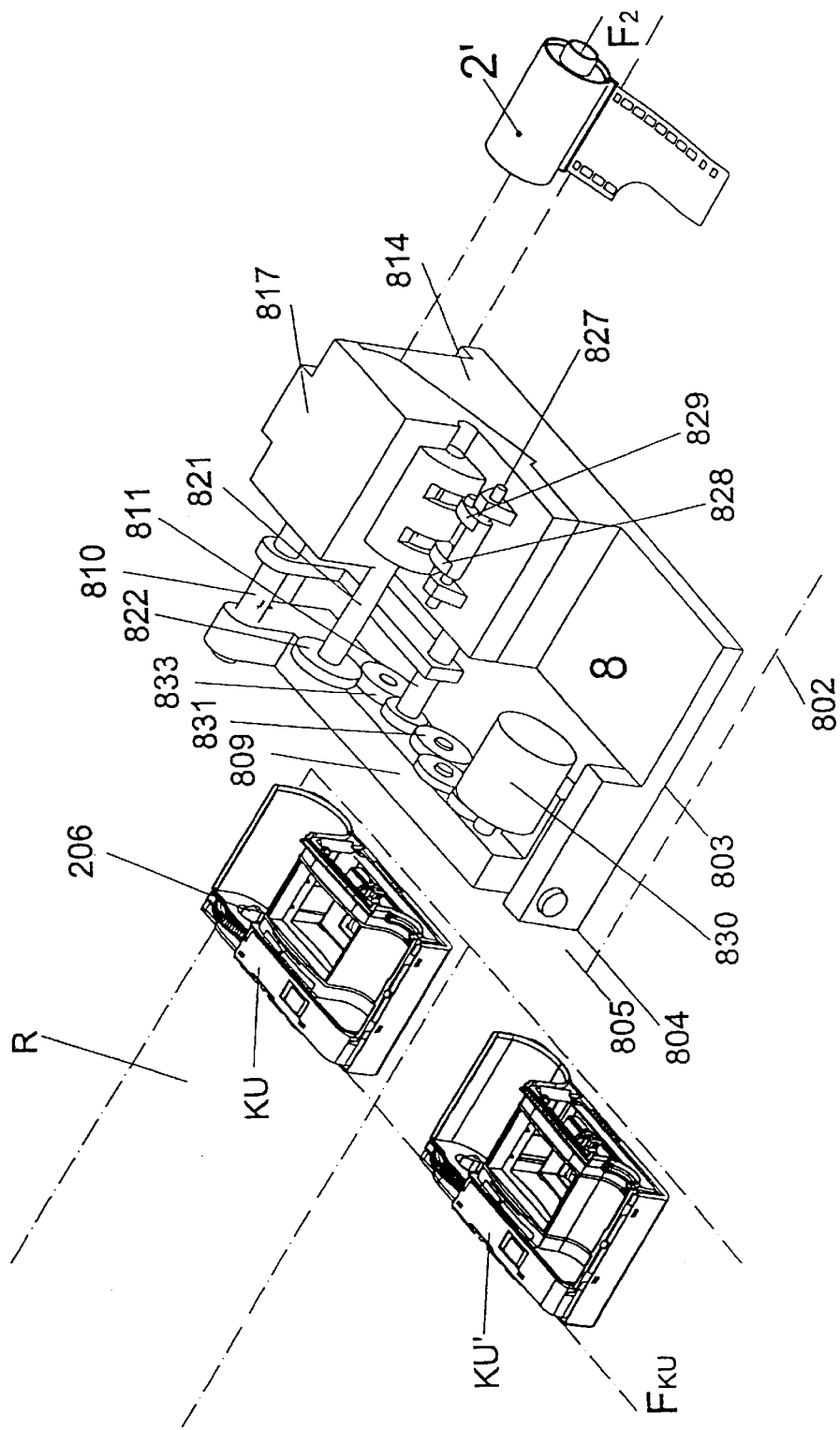
FIG. 17 illustrates the film unwinding and film insertion device of the loading apparatus in the operating state as shown in FIG. 16, after the transverse displacement and closure of a positioning plate.
Figure 19:
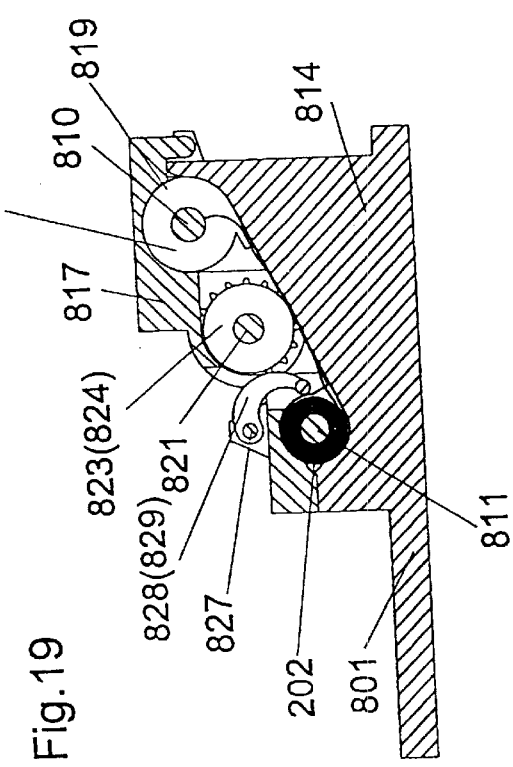
FIG. 19 illustrates the subject of FIG. 18 after the completion of the formation of the film supply roll.

The film advance device also comprises a positioning plate 817, which is rotatably mounted on an axis 818 fixed to the baseplate 801 and which can be swivelled between an open position shown in FIGS. 11, 12 and 14 and a closed position shown in FIGS. 17, 17 and 19 by means of a drive motor which is not illustrated. In its closed position, a concave first partial surface 819 of the positioning plate 817, which surface is approximately half-moon-shaped in section and which forms a hollow, approximately cylindrical half shell, fits round part of the curved surface of the film cartridge 203 which is pushed on to the push-on spindle 810, in order to secure it there in a desired angular position. Moreover, the positioning plate 817 has a second concave partial surface 820 which is also approximately half-moon-shaped in section and which forms a hollow, approximately cylindrical half shell. The half shell 820 of the positioning plate 817 is complementary to the half shell 816 of the film guide plate 814, so that when the positioning plate 817 is in its closed position these two half shells form a hollow cylindrical film winding space W, which is approximately circular in section and which comprises more than three quarters of a complete circle, for the formation of a film supply roll 202.

A spindle 821 is mounted between the half shells 819 and 820 on the positioning plate 817, to which spindle a gear-wheel 822 and a pair of sprocket wheels 823, 824 are fixed. Teeth of the sprocket wheels 823, 824 can pass through lateral edge perforations of the film 201 resting on the film guide face 815 and can engage in grooves 825, 826 (see FIG.

12) on the film guide plate 814. Moreover, two film contact pressure elements 828, 829 are preferably mounted on the positioning plate 817 on a pivot pin 827 above the half shell 820. These contact pressure elements are not shown in FIG. 12 for reasons of clarity, but are quite visible in FIGS. 16, 17 and 19. They are either formed as contact pressure springs or are under the action of a contact pressure spring, which is not illustrated, and are seated resiliently against the external periphery of the winding spindle 811 or against the outermost winding of the film supply roll 202 being formed on the winding spindle 811, as shown in FIG. 19.

In addition, the film advance device comprises an electric drive motor 830, which is fixed to the side plate 809 and which when switched on drives the winding spindle 811 continuously via a toothed wheel intermediate gear 831 and via a gearwheel 832 which is fixedly disposed on the spindle of the winding spindle 811. The sprocket wheels 823, 824 are also driven by the drive motor 830, via a coupling gearwheel 833 which meshes with the gearwheel 832 of the winding spindle and via the gearwheel 822 which is fixed to the sprocket wheel spindle 821, when the positioning plate 817 is in its closed position, in which the gearwheel 822 of the sprocket wheel spindle 821 meshes with the coupling gearwheel 833. The transmission ratios between the individual gearwheels of the side plate 809 are such that when the drive motor 830 is running the winding spindle 811 has a considerably higher peripheral speed than that of the sprocket wheels 823, 824.

The push-on spindle 810 forms a holding device for the film cartridge 203, and this function is complemented by the half shell 819 of the positioning plate 817. The side plate 809 forms a support for the push-on spindle 810, for the winding spindle 811 and for a film advance device which comprises the drive motor 830, the intermediate gear 831, the gearwheel 832 of the winding spindle 811 and the coupling gearwheel 833, as well as the sprocket wheel spindle 821 with the gearwheel 822 and the sprocket wheels 823, 824.

Mode of Operation of the Loading Apparatus Comprising the Film Unwinding and Film Insertion Device In cooperation with the subassemblies of the disposable camera which are fed to it, the loading apparatus 7 comprising the film unwinding and film insertion device 8 effects the unwinding of the photographic film 201 from the film cartridge 203 of a respective film unit 2; 2' etc., the formation of a film supply roll 202, the subsequent insertion of said film unit 2 comprising the film cartridge 203 and film supply roll 202 in a respective camera fabrication unit KU and the subsequent closure of said camera fabrication unit and the completion thereof to form a complete disposable camera by fitting a respective housing back part 3 and a housing base part 4 in the steps 1 to 12 which are listed below and which together form an operating cycle of the film loading apparatus 7.

Before the loading apparatus 7 is put in operation, and thus before the commencement of a first operating cycle of said loading apparatus, it is in the state shown in FIG. 11, but is without subassemblies placed on the feeder tracks. In this initial state, all the external lock gates 710 to 714 as well as the inner lock gate 706 of the loading apparatus 7 are closed. The film unwinding and film insertion device 8 which is contained in chamber 703 of the loading apparatus 7 in its initial state shown in FIGS. 11, 12 and 16, in which its baseplate 801 assumes the initial position 803 and the positioning plate 817 is in the open position.

Step 0:

When the film loading apparatus 7 is put in operation, the first operating cycle of a preliminary step takes place (step 0), in which the feeder tracks $F_2$, $F_{KU}$, $F_3$ and $F_4$ are loaded with batches of the respective subassemblies 2, 2' etc., KU, KU' etc., 3, 3' etc. and 4, 4' etc., so that the frontmost subassemblies of the individual batches are still outside the loading housing 701 but are directly in front of the respective, closed lock gate 711, 712; 713, as shown in FIG. 11 and as shown in part in FIG. 12 also.

Each film unit 2 is formed according to the 135 small image system and accordingly comprises a film leader section 201 protruding from the film cartridge 203 in the condition in which it is normally supplied by the film manufacturer. FIG. 11 only shows the frontmost unit in each case of the subassemblies 2, 2' etc., KU, KU' etc., 3, 3' etc. and 4, 4' etc. which are situated on the feeder tracks $F_2$, $F_{KU}$, $F_3$ and $F_4$.

Figure 13:
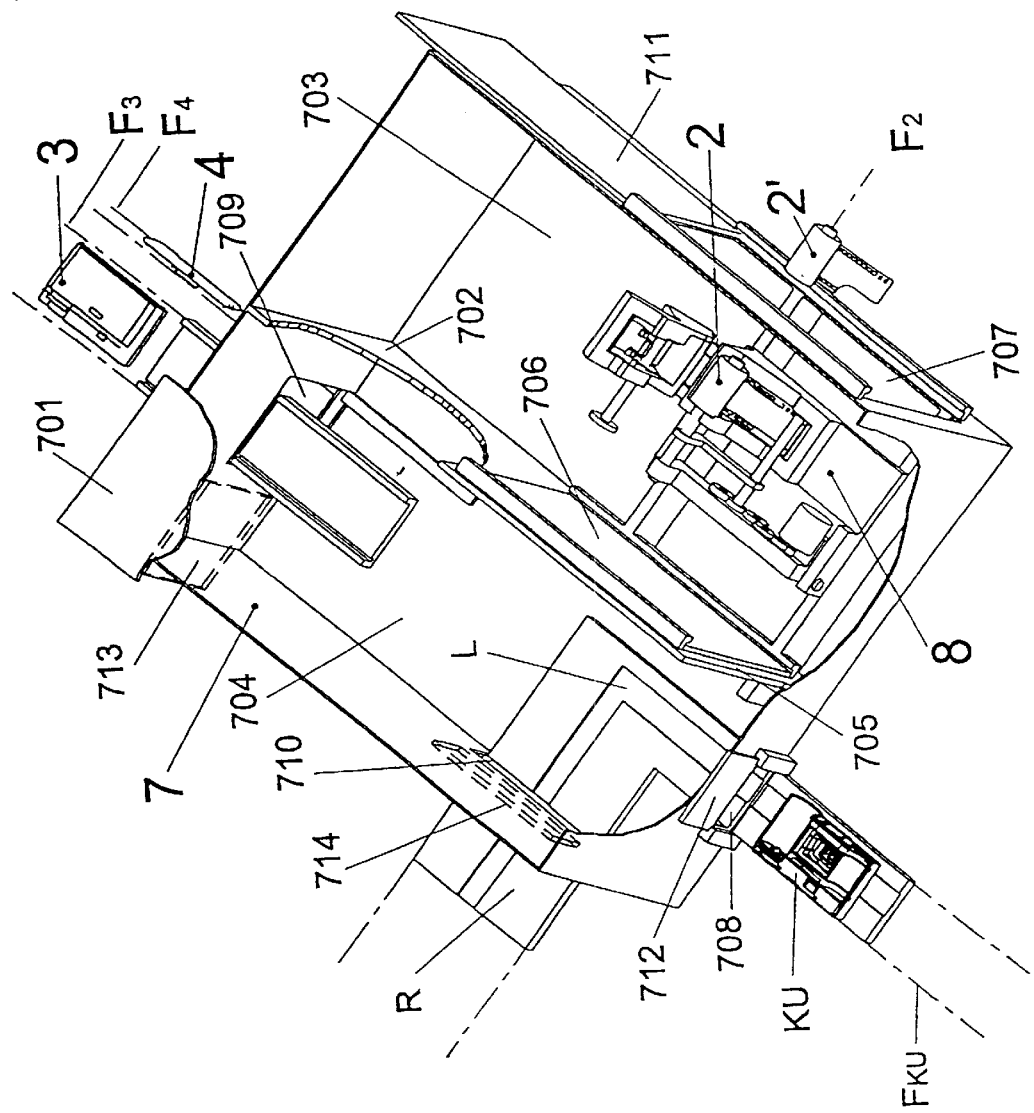
FIG. 13 illustrates the loading apparatus shown in FIG. 11 after a film unit has been fed into the film unwinding and film insertion device of the loading apparatus.
Figure 15:
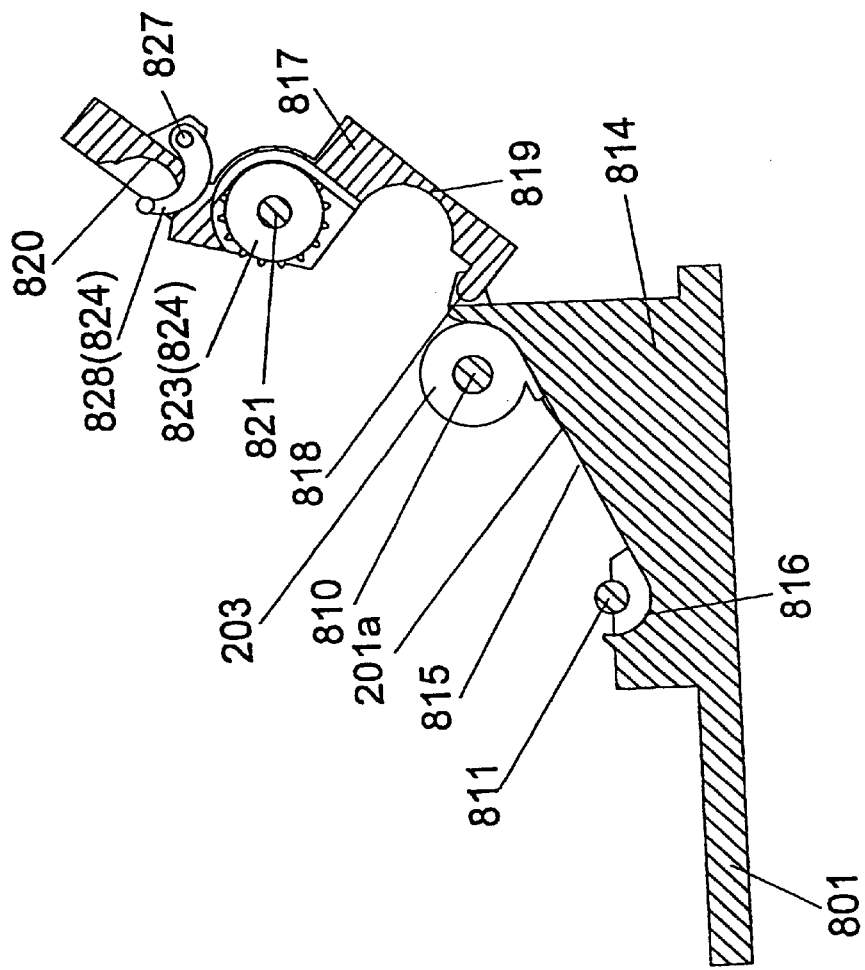
FIG. 15 is a section through the film unwinding and film insertion device of the loading apparatus, in the operating state as shown in FIG. 14.

Step 1:

Starting from the preparatory state shown in FIGS. 11 and 12, the frontmost film unit 2 of the series of film units 2, 2', etc. situated on the feeder track $F_2$ is moved from its position in front of the lock gate 711 into a push-on position inside chamber 703, for which purpose the lock gate 711 is opened momentarily. The film unit 2 with its film cartridge 203, which comprises a partially hollow film spool as is known, is pushed on to the push-on spindle 810 of the film unwinding and film insertion device 8 and is held there. The film leader section 201a which protrudes from the film cartridge 203 thus comes to rest on the film guide face 815 of the film guide plate 814, as shown in FIGS. 13, 14 and 15.

Step 2:

In a subsequent step 2 which is illustrated in FIG. 16, the frontmost units KU, 3 and 4 of the series of subassemblies KU, KU' etc., 3, 3', etc. and 4, 4' etc. situated on the feeder tracks $F_{KU}$, $F_3$ and $F_4$ are conveyed into chamber 704 of the loading housing 701 whilst the lock gates 712 and 713 are opened momentarily. The camera fabrication unit KU which is conveyed into chamber 704 assumes a position in the loading station L inside chamber 704, whilst the housing back part 3 and the housing base part 4 assume the stand-by positions inside chamber 704 which are illustrated in FIG. 16 and which are still somewhat remote from the loading station L.

In steps 1 and 2, the other subassembly units which are situated on the feeder tracks $F_2$, $F_{KU}$, $F_3$ and $F_4$ are automatically advanced by one conveying step, so that the subassemblies 2', KU', 3' and 4' each assume a position in front of the lock gates 711, 712, 713 of their associated feeder tracks. The lock gates 711, 712, 713 are closed again at the end of steps 1 and 2.

Figure 18:
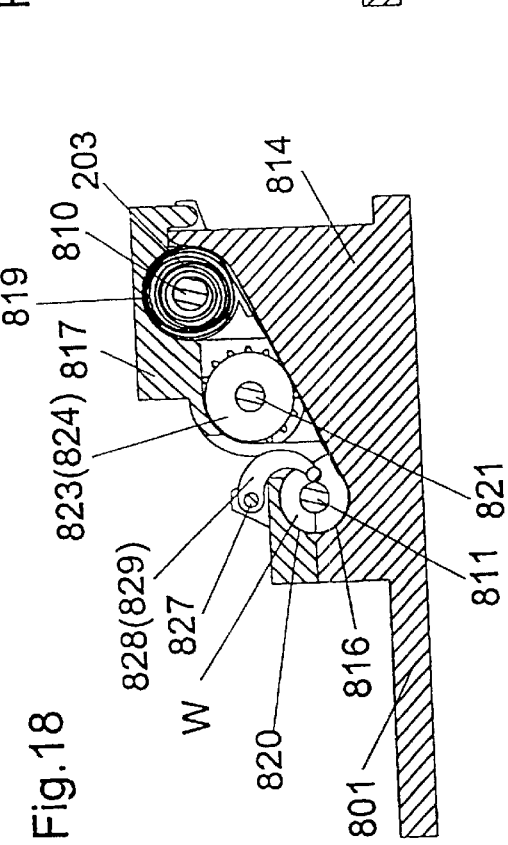
FIG. 18 is a section through the subject of FIG. 17.

Step 3:

In a subsequent step 3 which is illustrated in FIG. 17, the baseplate 801 of the film unwinding and film insertion device 8 is displaced from its initial position 803 into its intermediate position 804 in chamber 703 of the film loading apparatus 7 along the path of displacement 802, and is thus displaced in relation to the camera fabrication unit KU which is situated in the loading station L. Moreover, as illustrated in FIGS. 17 and 18, the positioning plate 817 is moved from its open position into its closed position, whereupon the first half shell 819 of the positioning plate 817 partially fits round the curved surface of the film cartridge 203 which is pushed on to the push-on spindle 810 and the second half shell 820 of the positioning plate 817, together with the film roll formation face 816 of the film guide plate 814, forms the hollow, approximately cylindrical film winding space W. Furthermore, when the positioning plate 817 is swivelled into its closed position, the gearwheel 822 on the sprocket wheel spindle 821 is brought into mesh with the coupling gearwheel 833 on the side plate 809, so that the sprocket wheel spindle 821 is coupled via the intermediate gear 831 to the drive motor 830. Teeth on the sprocket wheels 823, 824 thus engage through perforation holes in the film leader section 201a of the film unit 2 which is resting on the film guide face 815 and protrude into the grooves 825, 826 on the film guide face 815 of the film guide plate 814 which are shown in particular in FIG. 12.

Step 4:

In a subsequent step 4, the drive motor 830 is switched on, whereby the sprocket wheels 823, 824 are set in continuous, constant rotation. The film leader section 201a of the film 201 of the film unit 2 is thereby conveyed at a constant conveying speed to the film winding space W, and due to the intrinsic stiffness of the film 201 is pushed along the inner faces of the hollow cylindrical film winding space W and along the film contact pressure elements 828, 829 which are resiliently seated against the winding spindle 811, on to the winding spindle 811. Since when the drive motor 830 is switched on the winding spindle 811 rotates about its axis at a peripheral speed which is considerably higher than the peripheral speed of the sprocket wheels 823, 824, and is thus also higher than the conveying speed of the film 201 which is determined by the speed of rotation of the sprocket wheels 823, 824, the winding spindle 811 grasps the film leader section 201a. Frictional engagement between the winding spindle and the film thus occurs at the latest after a few revolutions of the winding spindle 811 and after the formation of the of first windings of the film roll on the winding spindle 811, so that the film is grasped by the rotating winding spindle 811 and is wound up on the peripheral surface thereof. An increasing number of film windings is thus formed on the winding spindle.

The inner walls of the hollow cylindrical film winding space W and the resilient film contact pressure elements 828, 829 in the winding space W thus form a film feeder device, in order to enable the winding spindle 811 to grasp and hold the film leader section 201a. The winding spindle 811 thus forms a film capture device in combination with the hollow cylindrical form of the winding space W and in combination with the resilient film contact pressure elements 828, 829.

The capture of the film leader on the winding spindle 811 can be further speeded up if the peripheral surface of the winding spindle 811 is provided with small lugs (not illustrated in the drawings) which can engage in perforation holes of the film 201 shortly after feeding the film leader on to the winding spindle 811 and which thus very rapidly create a driving connection between the winding spindle and the film. These lugs are shallow, however, so that they subsequently permit the winding spindle 811 to be pulled out of the completely formed film supply roll 204.

As soon as sufficient frictional engagement or a satisfactory driving connection between the winding spindle 811 and the film leader section 201a of the film 201 has occurred during this winding operation, the further advance of the film is no longer effected by the sprocket wheels 823, 824 but is effected by the more rapidly rotating winding spindle 811. From this point on, the film sprocket wheels 823, 824, which continue to engage in the edge perforations of the film 201, are entrained by the film 201 which is advanced by the winding spindle 811 at a higher and higher speed, wherein the increase in the speed of advance of the film is determined by the increasing peripheral speed of the outermost film winding in each case as the number of windings on the winding spindle 811 increases.

The difference between the increasing speed of advance of the film and the constant peripheral speed at which the sprocket wheels 823, 824 are driven by the drive motor 830 can be eliminated by an equalising device, preferable by providing an overrunning clutch, which is not illustrated in the drawings but which is known in the art, between the film advance device and the sprocket wheel spindle 821. Instead of this, it is also possible to provide an equalising device by arranging for the sprocket wheels 823, 824 to be raised from the path of film advance by a transverse displacement, which is not illustrated, of the sprocket wheel spindle 821 on the positioning plate 817 as soon as the drive of the film has been taken over by the winding spindle 811. An equalising device which acts to provide a similar result can also be provided by arranging for the positioning plate 817 as a whole to be lifted somewhat in order to eliminate the aforementioned differences in speed, so that the sprocket wheels 823, 824 are thereby disengaged from the film 201.

In any event, any braking effect which starts at the sprocket wheels 823, 824 when the drive of the film is transferred from the sprocket wheels 823, 824 to the winding spindle 811 is avoided due to these equalising measures, so that the perforation holes of the film 201 are protected from undesirable overload and damage when the film advance force is no longer generated by the slowly rotating sprocket wheels 823, 824, but is generated by the more rapidly rotating winding spindle 811 and the film roll which is formed thereon. A further advantage of this arrangement using one of the variants described above for the equalising device is that the formation of the film supply roll 202 is accelerated by the increase in the speed of film transport described above.

After winding the predetermined film length, which is transported out of the film cartridge 203 and which corresponds to the capacity of the film 201 to take a predetermined number of photographs, on to the winding spindle 811, and after forming a film supply roll 202 with an approximately corresponding number of windings on the winding spindle 811, the drive motor 830 is switched off and the operating state shown in FIG. 19 is reached.

The film length which is pulled out of the film cartridge 203 is determined in a manner known in the art, for example by counting the number of perforation holes of the film 201 which pass a counting station, which is not illustrated. It is by no means possible completely to pull the film 201 out of the film cartridge 203, since the film end is fixed to the film spool, which is not illustrated, of the film cartridge 203. To prevent the film end from being unintentionally and forcibly torn from the film spool contained in the film cartridge 203, a slipping clutch, which is not illustrated, can be provided in the film advance device.

Figure 20:
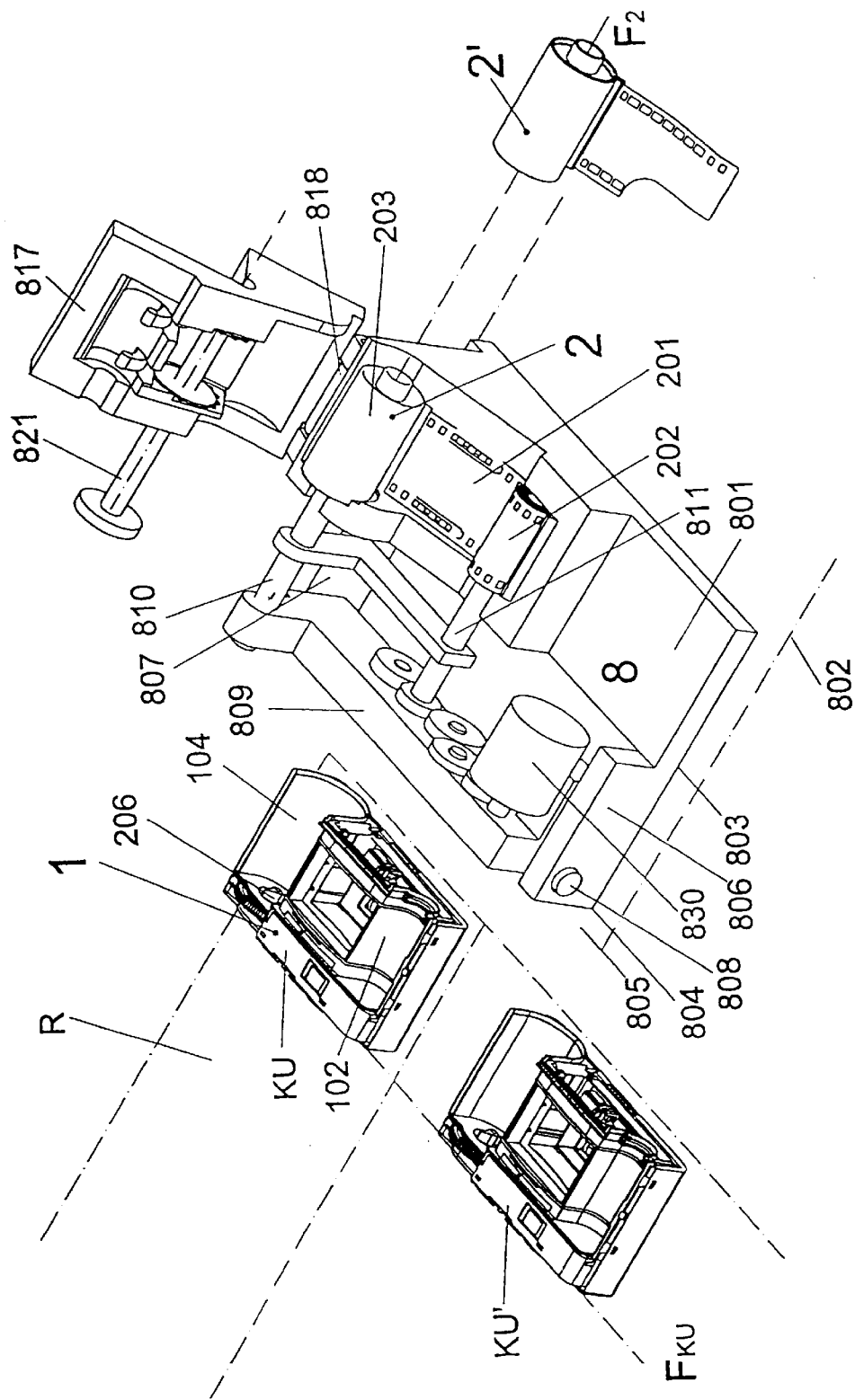
FIG. 20 is a perspective illustration of the film unwinding and film insertion device in the operating state as shown in FIG. 19, after opening the positioning plate.

Step 5:

In a subsequent step 5, the positioning plate 817 is swivelled back from its closed position shown in FIGS. 17 to 19 into its open position shown in FIG. 20. In the course of this movement, the sprocket wheel spindle 821 of the sprocket wheels 823, 824 is uncoupled again from the drive motor 830, which has already been switched off again.

Step 6:

In a subsequent step 6, the lock gate 706 on the partition wall 702 of the loading housing 701 is opened.

Figure 21:
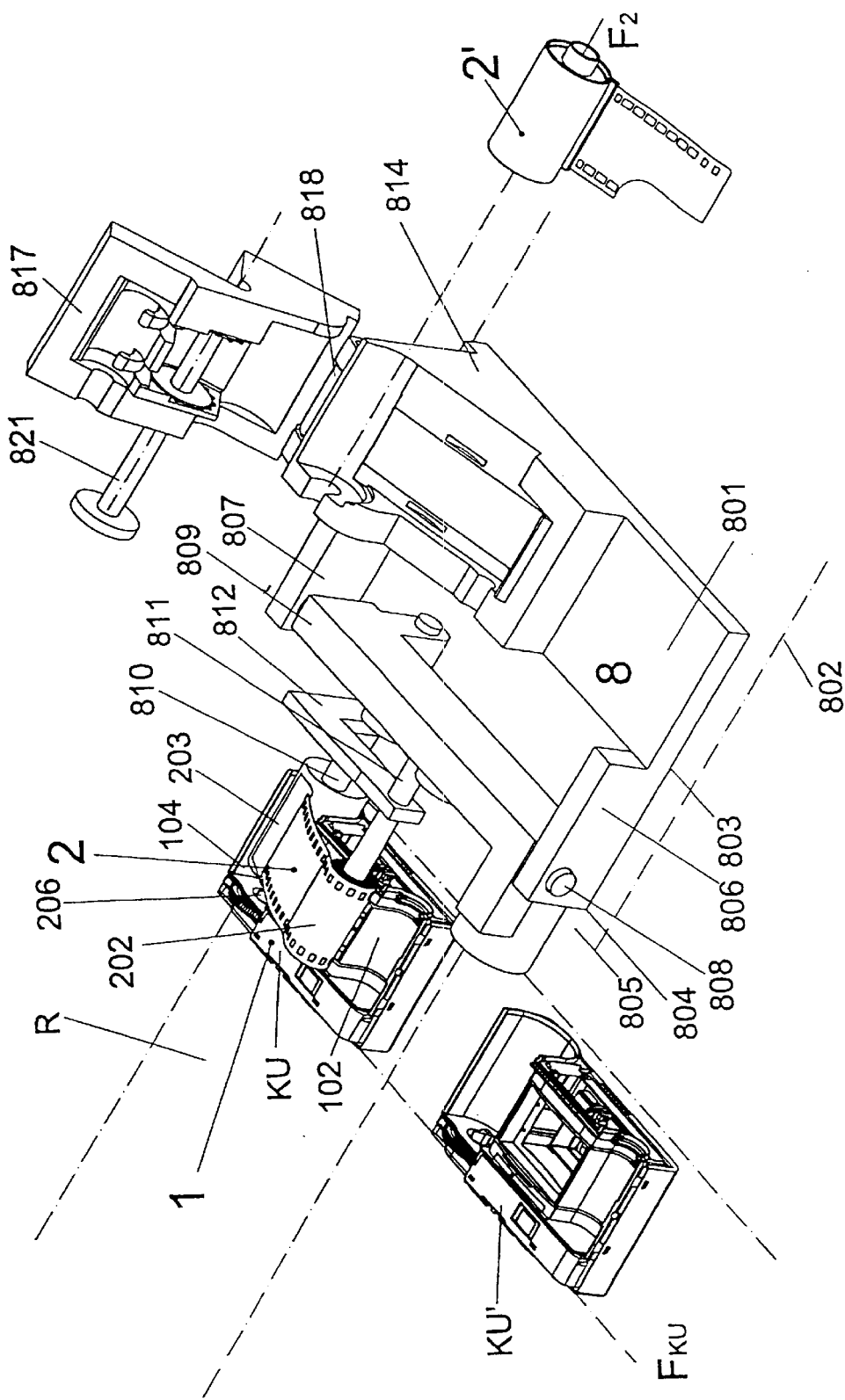
FIG. 21 illustrates the film unwinding and film insertion device shown in FIG. 20, after swivelling the film cartridge and the film supply roll towards the camera fabrication unit located in the loading station of the loading apparatus and inserting the film cartridge in the camera fabrication unit.

Thereafter, the side plate 809 together with the push-on spindle 810 and the pushed-on film cartridge 203, and together with the winding spindle 811 and the film supply roll 202 of the film unit 2 which is formed thereon, is swivelled anti-clockwise and downwards by about 180° about the pivot pin 808 from the position shown in FIG. 20 into the position shown in FIG. 21, and during this swivelling movement the push-on spindle 810 with the film cartridge 203 and the winding spindle 811 with the film supply roll 202 move into chamber 704 through the aperture 705 which is exposed by the lock gate 706. In the course of this movement, the film cartridge 203 is inserted in the film cartridge chamber 104 of the core subassembly 1 of the camera fabrication unit KU which is situated in the loading station L of chamber 704. At the same time, due to its shorter swivelling travel compared with the swivelling travel of the film cartridge 203, the winding spindle 811 with the film supply roll 202 formed thereon only reaches an intermediate position in which the film supply roll 202 has not yet entered the film supply chamber 102 of the core subassembly 1 but is situated above said film supply chamber as shown in FIG. 21. The shorter swivelling travel of the film supply roll 202 is due to the fact that in its initial position, which is shown in FIG. 12 amongst others, the winding spindle 711 extends from the plane which is determined by the pivot pin 808 and which is parallel to the plane of the baseplate 901, and according to the above statements has a lesser travel than that of the push-on spindle 810.

In the position shown in FIG. 21, the film cartridge 203 still protrudes somewhat, as seen in the axial direction, beyond the bottom edge of the film cartridge chamber 104 of the core subassembly 1, so that the left end face as shown in FIG. 21 of the film cartridge 203 does not collide with the film spool driver 206 of the film advance device of the core subassembly 1, which protrudes into the film cartridge chamber 104, when it is lowered into the film cartridge chamber 104.

Figure 22:
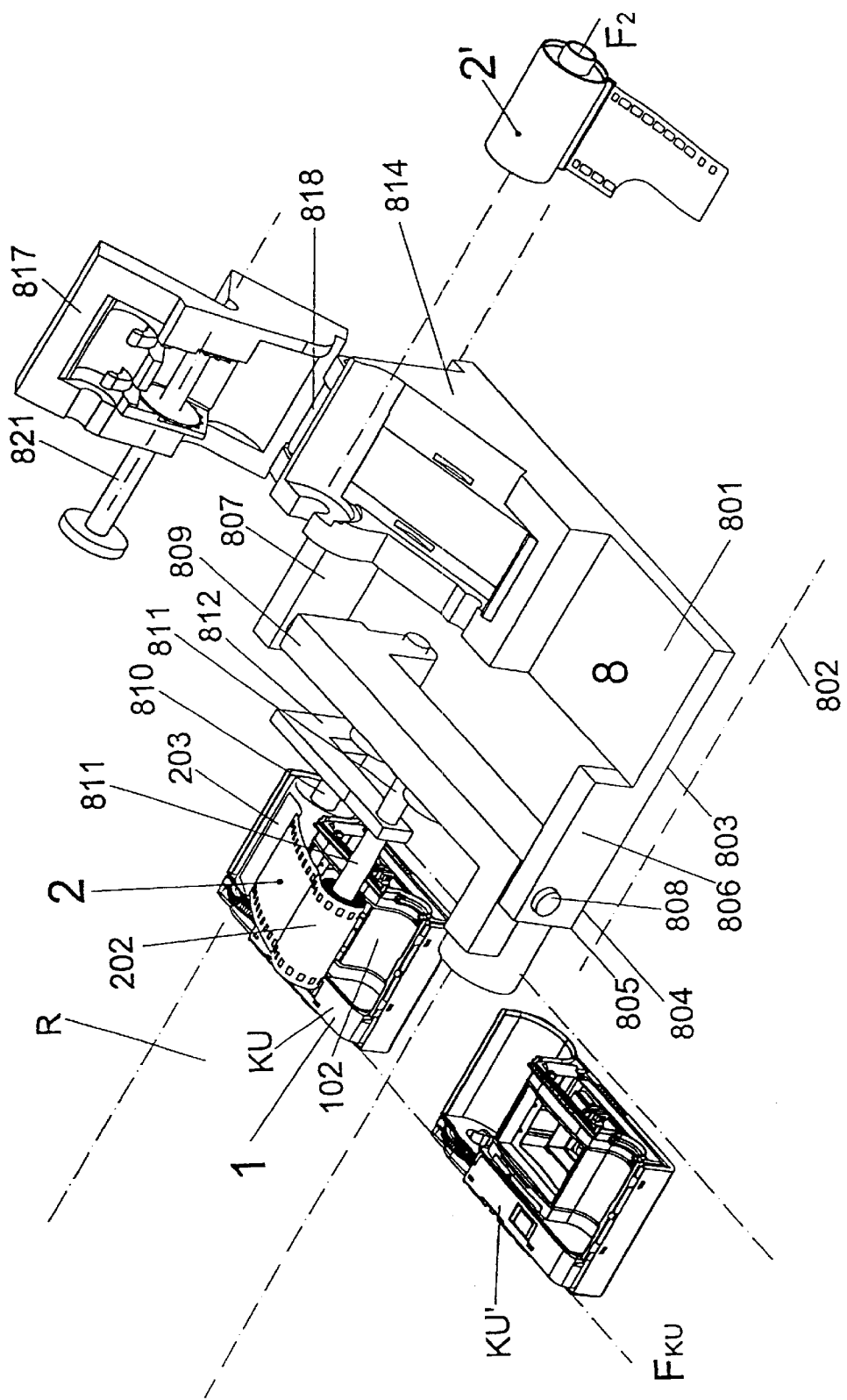
FIG. 22 illustrates the film unwinding and film insertion device shown in FIG. 21, after further transverse displacement inside the loading apparatus.

Step 7:

In a subsequent step 7, the film unwinding and film insertion device 8 is displaced along the path of displacement 802 from its intermediate position 804 into its final position 805 shown in FIG. 22, whereby the film cartridge 203 and the film supply roll 202 are subjected to a corresponding axial displacement in relation to the core subassembly 1 of the camera fabrication unit KU which is situated in the loading station L. This causes a coupling element 205, which is illustrated in FIG. 2 only, of a film spool, which is not illustrated, of the film cartridge 203 to become coupled to the film spool driver 206 of the film advance device of the core subassembly 1. The aforementioned axial movement of the film cartridge 203 also has the effect that it is then completely introduced axially into the film cartridge chamber 104 of the core subassembly 1.

Figure 23:
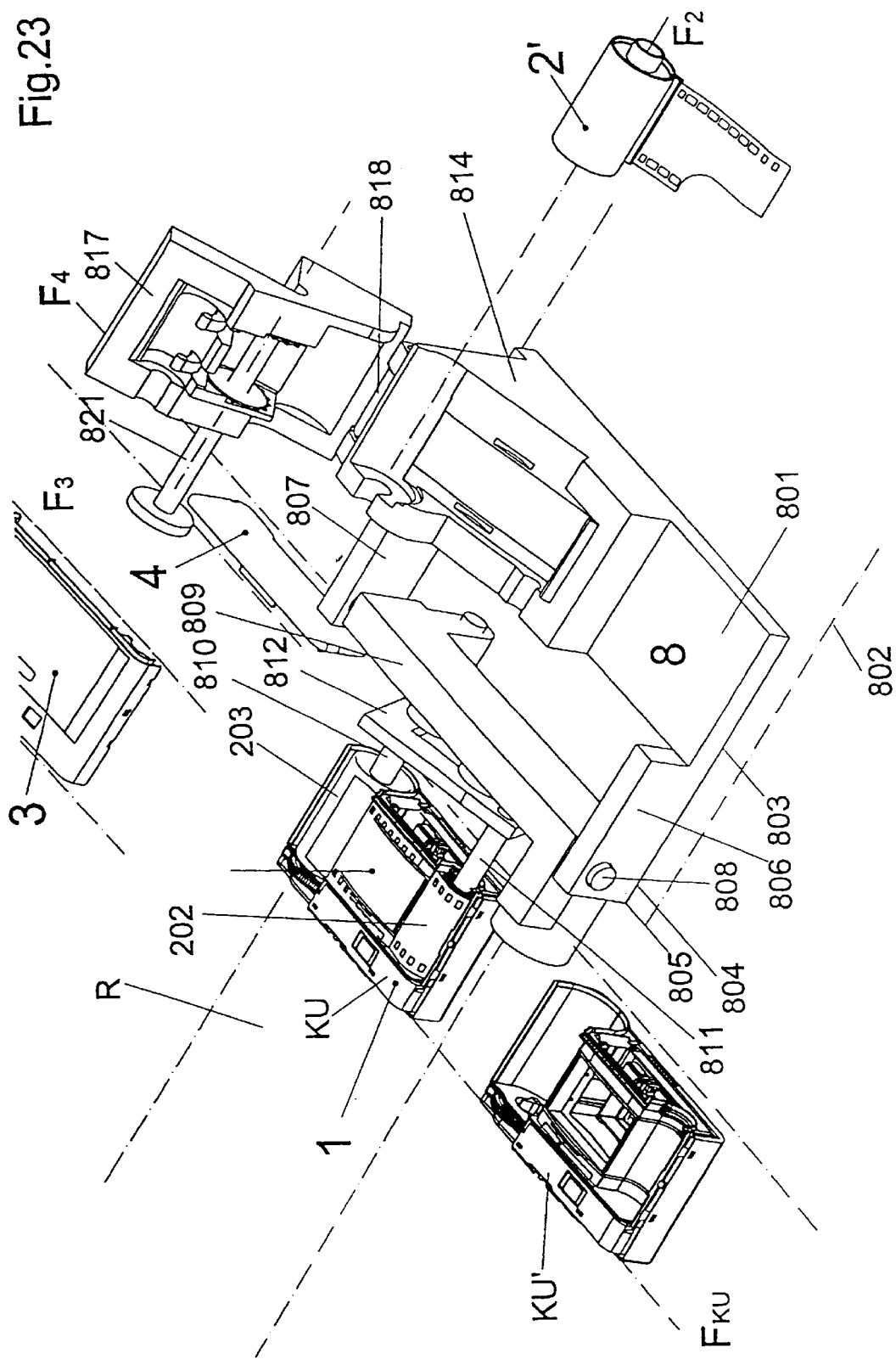
FIG. 23 illustrates the film unwinding and film insertion device shown in FIG. 22, after inserting the film supply roll in the camera fabrication unit.

Step 8:

In a subsequent step 8, the elbow lever 812 of the film unwinding and film insertion device 8, which lever is operated by a drive motor which is not illustrated, is swivelled from the position shown in FIG. 22 about the axis of the push-on spindle 810 into the position shown in FIG. 23, whereby the winding spindle 811 with the film supply roll 202 formed thereon is lowered into the film supply chamber 102 of the core subassembly 1. At the same time, the film portion between the film supply roll 202 and the film cartridge 203 comes to rest on film guide runners 106a, 106b of the core subassembly 1 which are illustrated in FIG. 2.

When the winding spindle 811, together with the film supply roll 202, swivels into the film supply chamber 102 of the core subassembly 1, the winding spindle 811 is inserted in the U-shaped recess 103a of the core subassembly 1 of the camera fabrication unit KU, which recess is disposed on the collar 103 which projects radially inwards into the film supply chamber 102 of the core subassembly 1, as shown in FIG. 2.

By not inserting the film supply roll 202 in the film supply chamber 102 of the core subassembly 1 until the film cartridge 203 has been completely inserted in the cartridge receiving chamber 104 of the core subassembly 1, it is ensured that during the transverse displacement of the film unit 2 which takes place in step 7, the film portion of the film 201 which is exposed between the film supply roll 202 and the film cartridge 203 does not yet rest on the film guide runners 106a, 106b of the core subassembly 1 and thus does not impede this transverse displacement of the film unit 2.

Step 9:

In a subsequent step 9, the housing back part 3 is grasped from its stand-by position shown in FIG. 16 by a suction arm, which is not illustrated but which is present in chamber 704 and which can also be swivelled by an electric motor, and is positioned above the camera fabrication unit KU situated in the loading station L by a swivelling movement of the suction arm, as can be seen from FIGS. 24 and 25.

Step 10:

In a subsequent step 10, the housing back part 3 is lowered on to the core subassembly 1 by the aforementioned suction arm, as illustrated in FIGS. 26 and 27. In this position, the housing back part 3 is locked to the core subassembly 1 in the manner which can be seen from FIG. 1 and which was described in detail above.

In this manner, the camera fabrication unit KU which has been loaded with film is closed at the back by fitting the housing back part 3.

In the course of this process, the U-shaped recess 306 (see FIG. 4) of the projection 305 which is present on the inner face of the housing back part 3 is placed from above round the winding spindle 811 which has been lowered into the film supply chamber 102 of the core subassembly 1, and together with the aforementioned collar 103 on the core subassembly 1 forms the aperture B which is illustrated in FIG. 5 and which is also illustrated in FIG. 28 which is described below, and through which the winding spindle 811 projects radially outwards from the film supply chamber 102 of the core subassembly 1 as long as it is still in the position shown in FIGS. 26 and 27.

Step 11:

In a subsequent step 11, the film unwinding and film insertion device 8 is moved back from its final position 805 into its initial position 803.

The distance between the initial position 803 and the final position 805 of the film unwinding and film insertion device 8 is designed so that due to its return from its final position 805 into its initial position 803 the push-on spindle 810 is pulled out of the film cartridge 203 inserted in the camera fabrication unit KU by axial displacement. At the same time, due to the return of the film unwinding and film insertion device 8 into its initial position, the winding spindle 811 is pulled out of the film supply roll 202 inserted in the camera fabrication unit KU through the aforementioned aperture B. The operating state shown in FIG. 28 is thus reached. To make it easier to pull off the winding spindle 811 from the inside of the film supply roll 202, the winding spindle 811 is turned back by a motor, by a few revolutions in the direction opposite to the direction of winding, at the start of step 11 and before the pull-off operation, whereby the film supply roll 202 formed on the winding spindle 811 is relieved from stress and the innermost windings of the film supply roll 202 become detached from the peripheral surface of the winding spindle 811 by "springing off" within the space of the film supply chamber 102 of the core subassembly 1 which is closed at the back by the housing back part 3.

Even if there is still a frictional engagement or an initially effective driving connection between the winding spindle 811 and the innermost winding of the film supply roll 202 when the winding spindle 811 is pulled out of the film supply roll 202 through the aperture B (see FIGS. 5 and 28), the winding spindle 811 cannot outwardly axially entrain the innermost winding and the adjacent windings of the film supply roll 202 during its axial return movement, since the edge of the film supply roll 202 facing the aperture B becomes seated against the collar 103 and the projection 305 which form aperture B inside the film supply chamber 102, and is thereby prevented, despite the aforementioned frictional engagement or driving connection which may still exist, from participating in the axial return movement of the winding spindle 811. A frictional engagement or driving connection such as this is therefore overcome and eliminated when pulling off the winding spindle 811.

Step 12:

In a subsequent step 12, the housing base part 4 is moved from its stand-by position in chamber 704, which is illustrated in FIG. 16, by means of a further swivelling suction arm which is not illustrated but which is also present in chamber 704, and is positioned in front of the base of the camera fabrication unit KU which is present in the loading station L, as is illustrated in FIGS. 29 and 30.

In addition, the side plate 809 with the push-on spindle 810, which is now empty, and the winding spindle 811, which is also empty, is swivelled back by about 180° into its initial position, as shown in FIGS. 29 and 30.

Moreover, the aperture 705 in the partition wall 702 is closed again in a light-tight manner by the lock gate 706 shown in FIG. 30.

Step 13:

In a subsequent step 13, the housing base part 4 is pressed on to the base of the core subassembly 1 by the aforementioned further suction arm, which results in the closure of the core subassembly at its base as shown in FIGS. 31 and 32, wherein the housing back part 4 is locked to the core subassembly 1 in manner which can be seen in FIG. 1 and which was described in detail above.

The camera fabrication unit KU is thus closed at its base also by the fitting of the housing base part 4 and the camera is completely assembled with the formation of a light-tight film compartment for the film unit 2 which is inserted therein.

The operation of loading the camera fabrication unit KU with a film unit 2 and the operation of closing and completing the camera fabrication unit KU to form a complete disposable camera are thus complete.

However, a new operating cycle for the loading apparatus 7 is already set in action in step 13, in that the successive film unit 2' on the feeder track F₂ is introduced into chamber 703 of the loading housing 701 after opening the lock gate 711 momentarily again, and is pushed on to the push-on spindle 810 of the side plate 809, which is swivelled back into its original position, whilst a successive camera fabrication unit 2" is advanced in front of the lock gate 706 of the loading apparatus 7 as shown in FIGS. 31 and 32.

Step 1 of a new operating cycle therefore takes place, just like the one which has taken place in the current operating cycle shown in FIGS. 13 and 14, even though the current operating cycle is not yet fully completed and is continued by the following step 14.

Step 14:

As shown in FIG. 33, in order to complete the first operating cycle the camera which is loaded with the film unit 2 and which is completely assembled, and which was assembled from the camera fabrication unit KU, the film unit 2 contained therein, the housing back part 3 and the housing base part 4, is led out of the loading station L and chamber 704 of the loading housing 701 on the discharge track R on the momentary opening of the lock gate 714, in order to leave the loading apparatus 7.

The first operating cycle for loading the camera fabrication unit KU with a film unit 2 and for completing the camera fabrication unit KU to form a complete disposable camera by fitting a housing back part 3 and a housing base part 4 is thus complete.

However, in step 14, in which the new operating cycle which was set in motion in step 13 corresponding to a new step 2 of the new operating cycle, the next camera fabrication unit KU' is transferred into the loading station L of chamber 704 and the next housing back part 3' and the next housing base part 3' are moved into their respective stand-by positions in chamber 704, as shown in FIG. 33. The operations described in step 2 of the first operating cycle are thus repeated.

Continuation of the new operating cycle

The new operating cycle of the loading apparatus 7 subsequently continues in further steps 3 to 14 which correspond to steps 3 to 14 of the completed first operating cycle.

Further operating cycles for loading further fabrication units with photographic film units and for completing the fabrication units to form complete disposable cameras can follow analogously.

Control System

The sequences of movement which take place in the steps 1 to 14, and which are each operated by an electric motor, are controlled in the respective operating cycle, corresponding to the sequence of steps 1 to 14, by a central controller which is not illustrated in the drawings. This central controller can be formed, for example, by a correspondingly programmed microprocessor or a computer of a type of construction which is known in the art.

Amongst its other functions, the central controller controls the successive operating cycles so that they mutually overlap in order to shorten the total running time, and preferably controls them so that in a current operating cycle comprising 14 successive steps, for example, a subsequent operating cycle with a new step 1 begins in step 13, i.e. before the completion of the final step 14, wherein the current operating cycle continues with steps 13 and 14 and is therefore not ended prematurely.

Technical Principles and Modifications

The following statement is made inasmuch as the technical principles which form the basis of the invention in the embodiment described above, and modifications of said embodiment, have not already been explained in the above description, The film unwinding and film insertion device 8 of the loading apparatus 7 which was described above constitutes a preferred embodiment of a general technical principle, which according to the invention is that said film unwinding and film insertion device 8 comprises three components 814, 817, 809 with their associated component parts in each case, the first and second components 814 and 817, respectively, of which can be displaced in relation to each other by means of their associated component parts, and the third component 809 of which can be displaced in relation to the first and second components 814, 817 and in relation to the camera fabrication unit KU; KU' etc. situated in the loading station L of the film loading apparatus 7 by means of its associated component parts. In particular, in the embodiment described above the film unwinding part of the film unwinding and film insertion device 8 consists of the first component comprising the film guide plate 814, the film guide face 815 and the hollow cylindrical half shell 816, and of the second component comprising the positioning plate 817, the sprocket wheel spindle 821, the gearwheel 822, the sprocket wheels 823, 824, the hollow cylindrical half shells 819, 820 and the resilient film contact pressure elements 828, 829. In contrast, the film insertion part of the film unwinding and film insertion device 8 consists of the third component comprising the side plate 809, the push-on spindle 810, the winding spindle 811, the drive motor 830 and the intermediate gear 831.

As a modification of the embodiment described above, the aforementioned first and second components can also both be displaceable in relation to each other. Similarly, it is possible for the aforementioned third component alone, namely without the first and second components, to be displaced in a direction to or from the loading station L of the film loading apparatus 7.

Instead of the swivelling mounting of the positioning plate 817, a transversely displaceable mounting can also be provided with which the positioning plate 817 can be lowered from an upper initial position into a lower operating position and can be raised again. In this embodiment, in its lower operating position the displaceably mounted positioning plate assumes a position, the effect of which corresponds to the effect of the position of the positioning plate 817 as shown in FIGS. 17 to 19.

In the embodiment described above, the sprocket wheels 823, 824 together with the drive spindle 822 of the film advance device of the film unwinding and film insertion device 8, are situated on the positioning plate 817. Instead of this, it is also possible for the sprocket wheels to be disposed on the film guide plate 814 together with their drive spindle.

The film unwinding and film insertion device 8 of the loading apparatus 7 which was described above also constitutes a preferred embodiment of a further general principle, which according to the invention consists of offsetting the holding device for the film cartridge 203, which is preferably formed as a push-on spindle 810, and the winding spindle 811, on the common support, which is preferably in the form of side plate 809 described above, taking into consideration the displacement movement thereof, so that when the film cartridge 203 held by the holding device 810 is inserted in the cartridge receiving chamber 104 of the core subassembly 1 of the camera fabrication unit KU; KU' etc. which is situated in the loading station L, by a corresponding displacement of the support 809, the film supply roll 202 situated on the winding spindle 811 at first only reaches an intermediate station situated in the vicinity of the film supply chamber 102 of the core subassembly 1, without already having been inserted in said film supply chamber 102. The film supply roll 202 is only transferred from the intermediate station into the film supply chamber 102 by a subsequent displacement of the winding spindle 811, preferably by displacing the elbow lever 812, after the film cartridge 203 has been coupled to the film spool driver 206 in the core subassembly 1, preferably by an axial displacement of the push-on spindle 810.

Instead of the two-step transverse displacement of the film unwinding and film insertion device 8 between positions 803 and 804 or 804 and 805 in relation to the camera fabrication unit KU; KU' etc. situated in the loading station L of the chamber 704, which was explained in connection with the embodiment described above, the camera fabrication unit KU; KU' etc. which is situated in the loading station L each time can also be transversely displaced in two steps in relation to the film unwinding and film insertion device 8.

Similarly, instead of the swivelling elbow lever 812 on the support 809 for the complete insertion of the film supply roll 202 formed on the winding spindle 811 in the film supply chamber 102 of the core subassembly 1, a mechanism can also be provided on guide track $F_{KU}$ which effects a corresponding tilting movement of the camera fabrication unit KU; KU' etc. which is situated in the loading station L, so that the film supply chamber 102 of the core subassembly 1 receives the film supply roll 202 which is situated on the winding spindle 811 and which is located in the aforementioned intermediate position.

In the embodiment of the camera fabrication unit KU; KU' etc. which was described above, the latter consists of the core subassembly 1 and of the housing front part 5 which is fitted thereto. It is also possible, however, for the camera fabrication unit to be formed from the core subassembly 1; 1' etc. only, and for the respective housing front part 5 not to be fitted to the core subassembly 1 or 1' etc. until, after inserting the film unit 2; 2' etc. and after fitting the housing back part 3; 3' etc. and the housing base part 4; 4' etc., the subassembly which is thereby formed has left the loading apparatus 7.

In the embodiment described above, the disposable camera does not comprise a flash device. It is also possible, however, to construct a disposable camera with a built-in flash device and to load it with film according to the teaching described above.

In the embodiment described above, a projection 103 or 305, respectively, is provided both on the core subassembly 1 and on the housing back part 3, and these projections together form the aperture B. It is also possible to simplify this optimum design by providing a projection 103 or 305 on the core subassembly 1 only or on the housing back part 3 only, since the unwanted entrainment of the inner windings of the film supply roll 202 is prevented in this situation also when the winding spindle 811 is pulled off axially. It is also possible for the projections to be formed simply as rudimentary ribs which protrude radially into the interior of the film supply chamber 102 of the core subassembly 3, instead of forming them as projections which each form a closed semicircle of aperture B.

Instead of the film units 2; 2' etc., which comply with the "135" small image film system with a 35 mm embodiment roll film and which are used in the embodiment described above, film units can also be provided which are constructed according to another known roll film cartridge system, e.g. according to the known APS film system.

Instead of the sprocket wheels 823, 824, a conveyor roller without teeth which is driven by the spindle 821 and an opposite, freely rotatable counter-roller, which are preferably coated with rubber or with another frictional coating, can also be provided on the film guide face 815, wherein these rollers advance the film 202 which is passed between them by friction. This solution is particularly advantageous if an unperforated film or a film which complies with the APS system is inserted in the disposable camera.

Instead of the variants of an equalising device which were described above, an equalising device in the form of a slipping clutch which acts between the film advance device and the winding spindle 811 can also be provided between the winding spindle 811 and the film advance device. This slipping clutch reduces the peripheral speed of outermost winding of the film supply roll 202 which is being formed to the magnitude of the peripheral speed of the sprocket wheels 823, 824 which are driven by the drive motor 830. However, this results in a mechanical stress on the perforation holes of the film 201 and in a significant tightening of the film supply roll 202 which is formed on the winding spindle 811, without the film advance being accelerated.

As a modification of the embodiment described above, the control system for the loading apparatus can also be designed so that steps 1 to 14 of each operating cycle extend into one another. In particular, a type of control is also possible in which a following element of the series of subassemblies KU; KU' etc. 2: 2' etc., 3; 3' etc., or 4; 4' etc. is always fed into the loading housing 701 when in the course of a currently proceeding operating cycle a preceding element of the series of the respective subassemblies has left its corresponding position inside the loading housing 701, provided that it can be ensured that during the temporary opening of the associated lock gate and the entry of light into the chamber 703 or 704 of the loading housing 701 which results therefrom, the film of the respective film unit 2; 2' etc. which is situated therein is not subjected to unwanted exposure due to extraneous light.

| List of reference numerals | |
|---|---|
| 1 | core subassembly |
| 101 | main body |
| 102 | film supply chamber |
| 103 | bottom wall element in film supply chamber |
| 103a | recess in bottom wall element |
| 104 | film cartridge chamber |
| 105 | light well |
| 106 | film exposure frame |
| 106a | top film guide runner |
| 106b | bottom film guide runner |
| 107 | film advance wheel |
| 108 | sprocket wheel |
| 109 | taking lens |
| 110 | viewfinder lens |
| 111 | viewfinder eyepiece |
| 112 | shutter release lever |
| 113 | frame counter wheel |
| 114 | wall of film supply chamber |
| 115 | mounting peg |
| 116 | pin |
| 117 | cavity |
| 121 | upper labyrinth groove |
| 122 | lower labyrinth groove for housing back part |
| 122a | left bent portion of labyrinth groove |
| 122b | right portion of labyrinth groove |
| 123, 124 | lateral labyrinth tongues |
| 126, 127 | lower arcuate labyrinth tongues |
| 130 | lateral locking tab |
| 130a | back face the lateral locking tab |
| 131 | lateral locking tab |
| 133 | locking aperture |
| 134, 135 | pair of locking apertures |
| 137 | lateral locking tab |
| 139, 140 | guide projections |

| -continued | |
|---|---|
| List of reference numerals | |
| 141, 142 | pair of lateral locking tabs |
| 143, 144 | pair of lateral locking tabs |
| 2 | film unit |
| 201 | film |
| 201a | film leader section |
| 202 | film supply roll |
| 203 | film cartridge |
| 204 | cartridge mouth |
| 205 | film spool coupling part |
| 206 | film spool driver |
| 3 | housing back part |
| 301 | back wall |
| 302, 303 | side wall elements |
| 304 | top wall element |
| 305 | bottom wall projection |
| 306 | semicircular edge of bottom wall projection |
| 307 | slot-shaped advance wheel aperture |
| 308 | film contact pressure ribs |
| 311 | viewfinder eyepiece aperture |
| 321 | upper labyrinth tongue |
| 322 | lower labyrinth tongue |
| 322a | left bent portion of labyrinth tongue |
| 322b | left bent portion of labyrinth tongue |
| 323, 324 | lateral labyrinth grooves |
| 325 | lower middle labyrinth tongue |
| 328, 329 | lower lateral labyrinth tongues |
| 330, 331 | lateral locking apertures |
| 332 | locking aperture |
| 345 | locking tab |
| 360 | supplementary part for housing back part |
| 361 | catch |
| 361a | back face of catch |
| 364, 365 | catches |
| 4 | housing base part |
| 401 | baseplate |
| 402 | film supply√chamber covering region |
| 404 | film cartridge chamber covering region |
| 405 | baseplate intermediate region |
| 406 | trough |
| 407 | break-off line |
| 408 | baseplate edge region |
| 409 | tool aperture for prising open |
| 425 | middle rectilinear labyrinth groove |
| 426, 427 | arcuate labyrinth grooves |
| 426a | widened section in labyrinth groove 426 |
| 427a | widened section in labyrinth groove 427 |
| 428, 429 | lateral labyrinth grooves |
| 432, 433 | pair of locking tongues |
| 434, 435 | pair of locking tongues |
| 436 | lateral tab |
| 437 | lateral locking aperture |
| 438 | clamping rib |
| 439, 440 | pair of clamping projections |
| 5 | housing front part |
| 501 | front wall |
| 502, 503 | lateral wall elements |
| 504 | top wall element |
| 505 | aperture for taking lens |
| 506 | aperture for viewfinder lens |
| 507 | aperture for release diaphragm |
| 512 | shutter release diaphragm |
| 513 | viewing window for frame counter read-off |
| 515 | mounting eye |
| 541, 542 | pair of lateral locking apertures |
| 543, 544 | pair of lateral locking apertures |
| 545 | locking aperture |
| 7 | loading apparatus |
| 701 | housing of loading apparatus |
| 702 | partition wall |
| 703 | first chamber |
| 704 | second chamber |
| 705 | aperture in partition wall |

-continued

List of reference numerals

| | |
|---|---|
| 706 | lock gate on aperture 705 |
| 707 | aperture in housing wall |
| 708 | aperture in housing wall |
| 709 | aperture in housing wall |
| 710 | aperture in housing wall |
| 711 | lock gate on aperture 707 |
| 712 | lock gate on aperture 708 |
| 713 | lock gate on aperture 709 |
| 714 | lock gate on aperture 710 |
| 8 | film unwinding and insertion device |
| 801 | baseplate |
| 802 | path of displacement |
| 803 | initial position |
| 804 | intermediate position |
| 805 | final position |
| 806, 807 | bearing blocks |
| 808 | axis of side plate |
| 809 | side plate |
| 810 | film cartridge push-on spindle |
| 811 | film winding spindle |
| 812 | elbow lever |
| 813 | bearing fork |
| 814 | film guide plate |
| 815 | film guide face |
| 816 | film roll forming face |
| 817 | positioning plate |
| 818 | positioning plate axis |
| 819 | partial face of first positioning plate |
| 820 | partial face of second positioning plate |
| 821 | sprocket wheel spindle |
| 822 | gearwheel of sprocket wheel spindle |
| 823, 824 | sprocket wheels |
| 825, 826 | grooves in film guide face |
| 827 | pivot for film holding-down device |
| 828, 829 | film contact pressure elements |
| 830 | drive motor |
| 831 | intermediate gear |
| 832 | winding spindle gearwheel |
| 833 | intermediate gearwheel |
| Abbreviations | |
| A | film guide channel |
| B | aperture in film supply chamber |
| FU | functional unit |
| KU | fabrication unit |
| $F_{KU}$ | guide track for fabrication unit |
| $F_2$ | guide track for film unit |
| $F_3$ | guide track for housing back part |
| $F_4$ | guide track for housing base part |
| L | loading station |
| W | discharge track |

What is claimed is:

1. A process for loading a disposable camera with a photographic roll film to form a film supply roll (202) from a film length, a film leader section (201a) of which protrudes from a film cartridge (203) and which can be pulled out therefrom, wherein the film cartridge and the film supply roll are inserted in a core subassembly (1) of the disposable camera, comprising the following steps:

advancing the film length out of a film cartridge disposed on a holding device, by means of a continuously rotating film advance device (823, 824), transporting the film leader section (201a) of the film (201) into a hollow, approximately cylindrical film winding space (W) at a speed of film transport determined by the film advance device, and transporting the film leader section on to the peripheral surface of a rotating winding spindle (811) which is disposed in the film winding space and the peripheral speed of which is higher than the speed of film transport determined by the film advance device, after the film leader section has been grasped by the winding spindle, matching the speed of film transport to the peripheral speed of the outermost winding of the film roll being formed on the winding spindle or to the speed determined by the film advance device, after the film supply roll has been formed on the winding spindle from the predetermined film length, inserting the film cartridge in a film cartridge chamber (104) of the core subassembly and inserting the film supply roll in a film supply chamber (104) of the core subassembly, from the back in each case, fitting a one-piece housing back part (3), which covers the back of film cartridge chamber and the film supply chamber of the core subassembly, to the core subassembly of the disposable camera from the back to form light-tight joints between the core subassembly and the housing back part in the direction of fitting of the housing back part and locking the housing back part to the core subassembly, and subsequently and separately fitting a one-piece housing base part (4), which covers the base of the film cartridge chamber and the film roll chamber of the core subassembly, to the core subassembly from the underside with the formation of light-tight joints between the housing base part and the core subassembly and between the housing base part and the housing back part in the direction of fitting of the housing base part, and locking the housing base part to the core subassembly.

2. A process according to claim 1, wherein after the film leader section has been grasped by the winding spindle the speed of film advance is matched to the peripheral speed of the outermost winding of the film roll which is being formed on the winding spindle in each case, wherein the film advance device is made ineffective.

3. A process according to claim 1, wherein after the film leader section has been grasped by the winding spindle the speed of film advance is matched to the speed determined by the film advance device, wherein a slipping clutch becomes effective between the film advance device and the winding spindle.

4. A process according to claim 1, wherein the film winding space (W) is formed by fitting together two hollow cylindrical half shells (816, 820) of a film unwinding and film insertion device (8).

5. A process according to claim 1, wherein when the film cartridge is inserted in a film cartridge chamber of the core subassembly the film supply roll is only transferred into an intermediate station in the vicinity of the film supply chamber of the core subassembly, and before inserting the film supply roll from the intermediate station into the film supply chamber of the core subassembly a relative displacement of the film cartridge occurs along an axis thereof.

6. A process according to claim 1, wherein a plurality of camera fabrication units (KU, KU' etc.) of a batch, are each loaded with film in mutually identical operating cycles which each comprise a plurality of successive operating steps, wherein the first step of a subsequent operating cycle begins before the last step of a current operating cycle in each case.

7. A disposable camera, in which a roll film is inserted with a film cartridge and a film supply roll, according to claim 1 wherein a plurality of camera fabrication units (KU, KU' etc.) of a batch, are each loaded with film in mutually identical operating cycles which each comprise a plurality of successive operating steps, wherein the first step of a subsequent operating cycle begins before the last step of a current operating cycle in each case, comprising a core subassembly (1) with a film supply chamber (102) for receiving a film supply roll (202), a film cartridge chamber (104) for receiving a film cartridge (203), a film exposure frame (106) disposed between the film supply chamber and the film cartridge chamber, a film advance device (107) for advancing a photographic film from the film supply chamber (102) via the film exposure frame (106) to a film cartridge (203) disposed in the film cartridge chamber (104), and a taking lens (109) which depicts an object to be photographed in the region of the film exposure frame (106), a housing back part (3) which can be fitted to the core subassembly (1) from the back in the direction of the optical axis of the taking lens (109), a housing base part (4) which can be fitted to the core subassembly (1) from below in a direction perpendicular to the optical axis of the taking lens (109), and a housing front part (5) which can be fitted to the core subassembly (1) from the front in the direction of the optical axis of the taking lens (109), wherein the core subassembly (1) and/or the housing back part (3) has a projection (103, 305) which protrudes radially into the film supply chamber (102) of the core subassembly (1) and acts as a stop for an edge, which is oriented towards the housing base part (4), of a film (201) which forms the film supply roll (202), and wherein the core subassembly (1) forms a light-tight film compartment with the housing back part (3) and the housing base part (4).

8. A disposable camera according to claim 7, wherein the projection (103, 305) which is disposed on the core subassembly (1) and/or on the housing back part (3) has a concave recess (103a, 306) which surrounds a winding spindle (811) on which the film supply roll (202) is disposed when it is inserted in the film supply chamber (102) of the core subassembly (1).

9. A disposable camera according to claim 8, wherein in the film supply chamber (102) of the core subassembly (1) the concave recesses (103a, 306) of the projections (103, 105) which are disposed on the core subassembly (1) and on the housing back part (3) jointly form an approximately round aperture (B) through which the winding spindle (811) protrudes and through which it can be pulled off axially from the film supply roll (202) after the housing base part (4) has been fitted to the core subassembly (1).

10. A method of loading a disposable camera with a photographic roll film (201) which in an initial state is disposed in a film cartridge (203) containing a rotatable film spool, and extends by a film leader section (201a) from said film cartridge, wherein a film supply roll (202) of said film is formed outside said film cartridge by extracting an appropriate length of film from said film cartridge and, after insertion of said film cartridge and of said film supply roll into a housing subassembly (1) of the camera, the film length forming said film supply roll is moved back into said film cartridge step by step in the course of imagewise exposure of the film, and wherein a movement of inserting of said film cartridge (203) relative to a film cartridge chamber (104) of said housing subassembly (1) occurs in a first direction and then in a second direction which is perpendicular to said first direction, so that in the course of movement in said first direction said film cartridge (203) is moved to an intermediate position in which said film cartridge (203) is partially accommodated by said film cartridge chamber (104) of said housing subassembly (1), and in the course of movement in said second direction said film cartridge (203) is moved from said intermediate position to an end position in which said film cartridge (203) is completely accommodated by said film cartridge chamber (104) of said housing subassembly (1).

11. A method according to claim 10, wherein said film cartridge (203) in said intermediate position is axially offset with respect to a coupling member (206) arranged in the area of said film cartridge (104) of said housing subassembly (1) and being part of a film transport mechanism (205) of said housing subassembly (1), and in said end position a coupling member of said film spool of said film cartridge (203) is able to engage said coupling member (206) of said film transport mechanism of said housing assembly.

12. A method according to claim 11, comprising steps as follows:

moving said film cartridge (203) and a cartridge holding means (810) disposed on a carrier (809) relative to each other for joining one another, and moving said film leader section (201a) extending from said film cartridge (203), and a film winding spindle (811) disposed on said carrier (809) relative to each other for joining one another, wherein said cartridge holding means (810) and said film winding spindle (811) are disposed on said carrier (809) in a predetermined mutual distance;

forming said film supply roll (202) by rotating said film winding spindle (811) disposed on said carrier (809) so that a certain film length following said film leader section (201a) and corresponding to the length of film forming said film supply roll (202), is extracted from said film cartridge (203) disposed at said cartridge holding means (810) of said carrier (809); and inserting said film cartridge (203) which is disposed at said cartridge holding means (810) of said carrier (809), into said film cartridge chamber (104) of said housing subassembly (1) when disposed in a loading station (L), by moving of said carrier (809) relative to said housing subassembly (1) so that said film cartridge (203) is moved in said first direction for reaching said intermediate position in which said film cartridge is offset with respect to said coupling member (206) of said film transport mechanism (205) of said housing subassembly (1), and then said film cartridge (203) is moved in said second direction for reaching said end position in which the coupling member of said film cartridge is able to engage said coupling member (206) of said film transport mechanism (205) of said housing subassembly.

13. A method according to claim 12, wherein said film leader section (201a) of the film (201) is clamped in a position from which it is wound around said film winding spindle (811) for forming said film supply roll (202).

14. A method according to claim 12, wherein for forming said film supply roll (202) on said film winding spindle (811) said film leader section (201a) of the film (201) is caught by frictional contact between a circumferential surface of said film winding spindle (811) and the film (201).

15. A method according to claim 12, wherein for forming said film supply roll (202) on said film winding spindle (811) said film leader section (201a) of the film (201) is caught by at least one projection disposed on a circumferential surface of said film winding spindle (811) and provided to penetrate a perforation hole of the film (201).

16. A method according to claim 12, wherein after forming said film supply roll (202) the film together with said film cartridge (203) and said film supply roll (202) for insertion into said housing subassembly (1) is turned around an axis which is perpendicular to the axis of the film spool of said film cartridge (203), and is shifted in parallel to said film spool axis.

17. A method according to claim 12, comprising a step of turning of said film winding spindle (811) disposed on said carrier (809) relative to said housing subassembly (1) around an axis which is parallel to the axis of said film spool of said film cartridge (203) so that said film supply roll (202) formed on said film winding spindle (811) reaches a film supply roll chamber (102) of said housing subassembly (1).

18. A method according to claim 12, wherein, when said film supply roll (202) is inserted into a film supply roll chamber (102) of said housing subassembly (1), said film winding spindle (811) is removed from said film supply roll (202).

19. A method according to claim 12, wherein, said film winding spindle (811), before being removed from said film supply roll (202), is rotated in a sense opposite to the sense of winding, for disengaging said film supply roll (202) from the circumferential surface of said film winding spindle (811).

20. A method according to claim 12, wherein when said film winding spindle (811) is removed from said film supply roll (202), the film windings of said film supply roll are supported at their edges disposed toward the direction of removal of said film winding spindle (811).

21. A method according to claim 12, comprising, after insertion of the film supply roll (202) into the housing subassembly (1), steps as follows:
    covering said film cartridge chamber (104) and a film winding chamber (102) of said housing subassembly (1) from backside by attaching a housing back part (3) to said housing subassembly (1), thereby forming light-tight connections between said housing back part (3) and said core subassembly (1), and locking said housing back part to said core subassembly;
    removing said cartridge holding means (810) from said film cartridge (203) arranged in said film cartridge chamber (104) of said housing subassembly (1), and removing said film winding spindle (811) from said film winding (202) arranged in said film winding chamber (202) of said housing subassembly (1), by moving said carrier (809) relative to said housing subassembly (1);
    covering said film cartridge chamber (104) and said film winding chamber (102) of said housing subassembly (1) from a front side, by attaching a housing base part (4) to said housing subassembly (1), thereby forming light-tight connections between said housing base part (4) and said housing subassembly (1) and housing back part (3), and locking said housing back part (4) to said housing subassembly (1); and
    removing said housing subassembly (1) from said loading station (L).

22. A method for loading a series of disposable cameras which are similar to each other and each comprise a housing subassembly (1), sequentially with a photographic roll film, wherein said loading of each camera is performed by a method according to claim 12, and in successive cycles each including a plurality of method steps, in such a manner that a first method step of a cycle for loading a camera being next-following in the series of cameras to be loaded, commences prior to the last method step of the cycle for loading the camera respectively preceding in said series of cameras.

23. An apparatus for loading a disposable camera with a photographic roll film (201) which in an initial state is disposed in a film cartridge (203) containing a rotatable film spool, and extends by a film leader section (201a) from said film cartridge, wherein a film supply roll (202) of said film is formed outside said film cartridge by extracting an appropriate length of film from said film cartridge and, after insertion of said film cartridge and of said film supply roll into a housing subassembly (1) of the camera, the film length forming said film supply roll is moved back into said film cartridge step by step in the course of image-wise exposure of the film,
    said apparatus comprising moving means enabling moving of said film cartridge (203) relative to said film cartridge chamber (104) of said housing subassembly (1) of the camera in a first direction and then in a second direction which is perpendicular to said first direction, in such a manner that in the course of movement in said first direction said film cartridge reaches an intermediate position in which said film cartridge (203) is partially accommodated by said film cartridge chamber (104) of said housing subassembly (1), and in the course of movement in said second direction said film cartridge (203) is moved from said intermediate position to an end position in which said film cartridge (203) is completely accommodated by said film cartridge chamber (104) of said housing subassembly (1).

24. An apparatus according to claim 23, wherein said film cartridge (203) in said intermediate position is axially offset with respect to a coupling member (206) arranged in the area of said film cartridge (104) of said housing subassembly (1) and being part of a film transport mechanism (205) of said housing subassembly (1), and in said end position a coupling member of said film spool of said film cartridge (203) is able to engage said coupling member (206) of said film transport mechanism of said housing subassembly.

25. An apparatus according to claim 24, wherein said film cartridge in the course of insertion into said film cartridge chamber (104) of said housing subassembly of the camera is disposed on a carrier (809), and said moving means comprise:
    first adjusting means (808) for adjusting said carrier (809) relative to said housing subassembly (1) so that the film cartridge (203) disposed on said carrier (809) is moved in said first direction for reaching said intermediate position in which said film cartridge (203) is offset with respect to said coupling member (206) of said film transport mechanism (205) of said housing subassembly (1); and
    second adjusting means (804, 805) for shifting said carrier (809) together with the film cartridge disposed thereon relative to said housing subassembly (1) so that said film cartridge (203) is moved in said second direction for reaching said end position in which the coupling member of said film cartridge is able to engage said coupling member (206) of said film transport mechanism (205) of said housing subassembly.

26. An apparatus according to claim 25, comprising
    said carrier (809) with said cartridge holding means (810) for holding said film cartridge (203), and with a film winding spindle (811) for forming a film supply roll, wherein said cartridge holding means (810) and said film winding spindle (811) are disposed at said carrier in predetermined mutual distance;
    rotating means (830) for rotating said film winding spindle (811) around its axis so as to enable forming of said film supply roll (202) on said film winding spindle with extracting from said film cartridge (203) a film length corresponding to the length of the film forming said film supply roll,;

a loading station (L) for positioning a housing subassembly (1) of the camera;

said first adjusting means (808) for adjusting said carrier (809) relative to said housing subassembly (1) SO that the film cartridge (203) disposed on said carrier (809) is moved in said first direction for reaching said intermediate position in which said film cartridge (203) is offset with respect to said coupling member (206) of said film transport mechanism (205) of said housing subassembly (1), and said second adjusting means (804, 805) for shifting said carrier (809) together with the film cartridge disposed thereon relative to said housing subassembly (1) so that said film cartridge (203) is moved in said second direction for reaching said end position in which the coupling member of said film cartridge is able to engage said coupling member (206) of said film transport mechanism (205) of said housing subassembly; and turning means (812) for turning said film winding spindle (811) disposed on said carrier (809) relative to said housing subassembly (1) around an axis being parallel to said film spool of said film cartridge positioned in said film cartridge chamber (104) of said housing subassembly (1) so that the film winding roll (202) arranged on said film winding spindle (811) enters a film winding chamber (102) of said housing subassembly (1);

wherein said second adjusting means (804, 805) also are provided for shifting back said carrier (809) relative to said housing subassembly (1), whereby said cartridge holding means (810) is removed from said film cartridge positioned in said film cartridge chamber (104) of said housing subassembly (1), and said film winding spindle (811) is removed from said film supply roll (202) positioned in said film winding chamber (102) of said housing subassembly (1).

27. An apparatus according to claim 26, wherein said film winding spindle (811) is disposed on a lever (812) rotatably supported at said carrier (809).

28. An apparatus according to claim 27, wherein said lever (812) bearing said film winding spindle (811) is turnable around an axis being parallel to said film spool of said film cartridge (203) disposed on said carrier (809).

29. An apparatus according to claim 26, wherein said rotating means (830) for said film winding spindle (811) are arranged at said carrier (809).

30. An apparatus according to claim 26, wherein said film winding spindle (811) is connected to said rotating means (830) via gear means (831) including clutch means.

31. An apparatus according to claim 26, wherein said film winding spindle (811) is connected to said rotating means (830) via friction clutch means.

32. An apparatus according to claim 26, comprising clamping means (828, 829) for clamping said film leader section (201a) so as to be windable for forming the film supply roll (292) on said film winding spindle (811).

33. An apparatus according to claim 26, comprising film feeding means (816, 820, 828, 829) for feeding the film toward the circumferential surface of said film winding spindle (811).

34. An apparatus according to claim 33, wherein said clamping means (828, 829) are part of said film feeding means (816, 820, 828, 829) and resiliently engage said circumferential surface of said film winding spindle (811).

35. An apparatus according to claim 33, wherein said film feeding means (816, 820, 828, 829) form a concave film guiding surface partially surrounding said film winding spindle (811).

36. An apparatus according to claim 35, wherein said concave film guiding surface is formed by two semispherical member (816, 820) forming a winding chamber (W) which approximately forms a hollow cylinder.

37. An apparatus according to claim 26, wherein said film winding spindle (811) at its circumferential surface has at least one projection capable to engage an edge perforation of the film forming a film supply roll (202) on said film winding spindle (811).

38. An apparatus according to claim 26, wherein said carrier (809) is formed by a plate adjustable in two perpendicular directions relative to said load station (L).

39. An apparatus according to claim 26, wherein said carrier (809) is turnable around an axis (808) being perpendicular to the axis of the film spool of said film cartridge held by said film cartridge holding means (810), and is shiftable in parallel to said axis.

40. An apparatus according to claim 26, wherein said carrier (809) is turnable between a position for forming said film supply roll (202) and further positions for inserting said film cartridge (203) and said film supply roll into said film cartridge chamber (104) and said film supply roll chamber (102) of said housing subassembly (1) positioned in said loading station (L).

41. An apparatus according to claim 26, wherein electric drive means are provided for driving any of said moving and adjusting means, and said electric drive means are controllable by central control means.

42. An apparatus for loading a series of cameras which are similar to each other and each comprise a housing subassembly (1), sequentially with a photographic roll film, wherein said loading of each camera is performed by An apparatus according to method according to claim 26, and in successive cycles each including a plurality of steps, in such a manner that a first step of a cycle for loading a camera being next-following in the series of cameras to be loaded, commences prior to the last method step of the cycle for loading the camera respectively preceding in said series of cameras.

* * * * *